(12) United States Patent
Elworthy

(10) Patent No.: US 6,937,975 B1
(45) Date of Patent: Aug. 30, 2005

(54) APPARATUS AND METHOD FOR PROCESSING NATURAL LANGUAGE

(75) Inventor: David Elworthy, Cambridge (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/400,872

(22) Filed: Sep. 22, 1999

(30) Foreign Application Priority Data

Oct. 8, 1998 (GB) .............................................. 9821969

(51) Int. Cl.⁷ .......................................... G06F 17/27
(52) U.S. Cl. ............................................................ 704/9
(58) Field of Search ....................... 704/1, 9, 10; 707/3, 707/4, 5, 530, 531

(56) References Cited

U.S. PATENT DOCUMENTS

| | | | |
|---|---|---|---|
| 4,914,590 A | | 4/1990 | Loatman et al. ............. 364/419 |
| 5,060,155 A | * | 10/1991 | Van Zuijlen .................... 704/9 |
| 5,404,506 A | | 4/1995 | Fujisawa et al. ............. 395/600 |
| 5,812,994 A | | 9/1998 | Imlah ........................... 706/45 |
| 5,840,701 A | | 11/1998 | Hsia ............................ 514/21 |
| 5,870,701 A | * | 2/1999 | Wachtel ........................... 704/9 |
| 5,893,134 A | | 4/1999 | O'Donoghue et al. ....... 707/536 |
| 5,933,822 A | * | 8/1999 | Braden-Harder et al. ....... 707/5 |
| 5,943,643 A | | 8/1999 | Van De Veen ................. 704/2 |
| 5,960,384 A | * | 9/1999 | Brash ............................. 704/9 |
| 5,963,940 A | * | 10/1999 | Liddy et al. .................... 707/5 |
| 6,026,388 A | * | 2/2000 | Liddy et al. .................... 707/1 |
| 6,144,958 A | * | 11/2000 | Ortega et al. ................... 707/5 |
| 6,161,084 A | * | 12/2000 | Messerly et al. ............... 704/9 |
| 6,167,370 A | * | 12/2000 | Tsourikov et al. ............. 704/9 |
| 6,246,977 B1 | * | 6/2001 | Messerly et al. ............... 704/9 |

FOREIGN PATENT DOCUMENTS

| | | |
|---|---|---|
| EP | 0 118 187 | 1/1984 |
| EP | 0 737 928 | 10/1996 |
| GB | 2269923 | 2/1994 |
| GB | 2272091 | 5/1994 |

OTHER PUBLICATIONS

Patent Abstracts of Japan, vol. 97, No. 3, Mar. 31, 1997 (Abstract of JP 08–287094).

"A Spoken Language System for Information Retrieval", by S. K. Bennacef, et al., 1994 International Proceedings of 1994 International Conference on Spoken Language Processing, Yokohama, JAPAN, Sep. 18–22, 1994, pp. 1271–1274, vol. 3.

"A Stochastic Case Frame Approach for Natural Language Understanding", by W. Minker, et al., Proceeding of Fourth International Conference on Spoken Language Processing, ICSLP '96, Philadelphia, PA, Oct. 3–6, 1996, pp. 1013–1016, vol. 2.

(Continued)

*Primary Examiner*—Patrick N. Edouard
(74) *Attorney, Agent, or Firm*—Fitzpatrick, Cella, Harper & Scinto

(57) ABSTRACT

A user interface is described which allows a user to enter input data representing a phrase, sentence, or passage of a natural language in order to cause the initiation of an action by a computer. The input data is parsed in order to generate meaning data in the form of lexical meaning representations and link data which defines the modification relationship between the lexical meaning representations. The meaning data of the input data is compared with similar meaning data for reference data by identifying a head lexical meaning representation which does not modify any other lexical meaning representations. An equivalent lexical meaning representation is identified in the reference data and then equivalent chain linked pairs of lexical meaning representations are identified in the input meaning data and the reference meaning data. The computer responds in dependence upon the degree of equivalence determined.

92 Claims, 15 Drawing Sheets

OTHER PUBLICATIONS

"A spoken Language System for Automated Call Routing", by G. Riccardi, et al., 1997 IEEE Internation Conference on Acoustics, Speech, and Signal Processing, Munich, Germany, Apr. 21–24, 1997, pp. 1143–1146.

"Argumentation in Lexicon and Cognitive Modeling", by P.Y. Raccah, Proceedings the Second International Conference on Exper Systems for Development, Bangkok, Thailand, March 28–31, 1994, pp. 125–131.

"Automatic Syntactic Analysis of Free Text", by C. Schwarz in Journal of the American Society of Information Science, vol. 41, No. 6, Sep. 1990, pp. 408–417.

"A Robust Parsing Algorithm for Link Grammars" by Dennis Grinberg, et al., Carnegie Mellon University School of Computer Sciences Technical Report No. CMU–CS–95–125, Aug. 2, 1995.

"Incremental Semantics and Interactive Syntactic Processing" by Nicholas John Haddock, PhD. Thesis, University of Edinburgh, 1988.

"Grammatical Trigrams: A Probabilistic Model of Link Grammar" by John Lafferty, et al., Carnegie Mellon University School of Computer Sciences Technical Report No. CMU–CS–92–181, Sep. 1992.

"Dependency parser demo" by Timo Jarvinen, et al., available at http://www.ling.helsinki.fi/~tapanain/dg/.

"Inference and Estimation of a Long–Range Trigram Model" by S. Della Pietra, et al., Carnegie Mellon University of School of Computer Sciences Technical Report No. CMU–CS–94–188, Sep. 1994.

"Introduction to WordNet: An On–Line Lexical Databas" by George A. Miller, et al., Aug. 1993.

"Experiments in Automatic Phrase Indexing For Document Retrieval: A Comparison of Syntactic and Non–Syntactic Methods" by Joel. L. Fagan, Ph.D. Thesis, Department of Computer Science, Cornell University, Sep. 1987.

"A Dependency Parser for English" by T. Järvinen, et al., published in Technical Reports, No. TR–1, Department of General Linguistics, University of Helsinki, Mar. 1997.

"A Nonprojective Dependency Parser" by Pasi Tapanainen, et al., published in Proceedings of the $5^{th}$ Conference on Applied Natural Processing, Washington, DC, Apr. 1997.

"Deterministic Part–of–Speech Tagging with Finite–State Transducers" by Emmanuel Roche, et al. published in Computation Linguistics, vol. 21, No. 2, 1995, pp. 227–253.

"Partial Parsing via Finite–State Cascades" by Steven Abney published in the Proceedings of the ESSLL1 '96 Robust Parser Workshop, 1996, pp. 1–8.

"Automatic Error Detection in Part of Speech Tagging" by David Elworthy published at pp. 256–268 of "New Methods in Language Processing" edited Daniel Jones, et al., 1997.

"A Practical Part–of–Speech Tagger" by Doug Cutting, et al., published in the Proceedings of the $3^{rd}$ Conference on Applied Natural Lanuage Processing at pp. 133–140, 1992.

"The Application of Morpho–Syntactic Language Processing to Effective Phrase Matching", by P. Sheridan, et al., Information Processing & Management, 1992, UK, vol. 28, No. 3, pp. 349–369.

"The Constituent Object Parser: Syntactic Structure Matching for Information Retrieval", by D. Metzler, et al., ACM Transaction on Information Systems, Jul. 1989, vol. 1989, No. 3 , pp. 292–316.

"Meaning Description by SD–Forms and a Protoype of a Conversational–Text Retrieval System", by E. Kawaguchi, et al., Proceedings, Fifth International Conference on Tools with Artifical Intelligence TAI '93, Proceedings of 1993 IEEE Conference on Tools with AI, Boston, MA, No. 8–11, 1993, pp. 306–310.

"Database Query Generation from Spoken Sentences", by H. Aust, et al., Proceedings, Second IEEE Workshop on Interactive Voice Technology for Telecommunications Applications, Kyoto, JAPAN, pp. 141–144, 1994.

"A Natural Language Text Retrieval System with Relevance Feedback", by E. D. Liddy, et al. $16^{th}$ National Online Meeting Proceedings, New York, NY, May 2–4, 1995, pp. 259–261.

"A speech–text Retrieval System Using Semantic Data of the English/Japanese Conversational Texts", by E. Kawaguchi, et al., 1994 International Symposium on Speech, Image Processing and Neural Networks Proceedings, Hong Kong, Apr. 13–16, 1994, pp. 599–602, vol. 2.

"Progress in the Application of Natural Language Processing to Information Retrieval Tasks" by A. F. Smeaton, Database Inspec. Institute of Electrical Engineers, Stevenage, GB, Computer Journal, Jun. 1992, vol. 35, No. 3, pp. 268–278.

"Experiments on Using Semantic Distances Between Words in Image Caption Retrieval", by A. F. Smeaton, et al., $19^{th}$ Annual International ACM Sigir Conference on Research and Development in Information Retrieval, Zurich, Switzerland, Aug. 18–22, 1996, Vol. Spec. Issue, pp. 174–180.

"Interpreting Word Reognition Decisions with a Document Database Graph", J. J. Hull, et al., Proceedings of the Second International Conference on Document Analysis and Recognition, Tsukuba Science City, JAPAN, Oct. 20–22, 1993, pp. 488–492.

"Interacting With an Intelligent Planning System Using English Sentences", by B. Crabtree, et al., First International Conference on Expert Planning Systems, Conf. Publ. No. 322, Brighton, UK, Jun. 27–29, 1990, pp. 169–174.

* cited by examiner

APPARATUS AND METHOD FOR PROCESSING NATURAL LANGUAGE

The present invention generally relates to a method and apparatus for processing natural language and in particular to a method and apparatus for matching input natural language to reference natural language having regard to the meaning of the natural language.

With the continuing advancement of computers and data processing equipment, wherein the operation of the equipment has become ever more complicated, there is a need to simplify the user interface to provide a more "user friendly" interface which can be used intuitively thereby reducing the training required by the user.

When a user wishes a computer or data processing apparatus to carry out an operation, an instruction must be entered by the user. The use of natural language as a method of entering instructions has been investigated as for example disclosed in EP-A-0118187.

When natural language is used instead of simply entering key words, it is necessary for the meaning of the entered natural language instructions to be determined. The meaning of the input instructions in a natural language can be determined using a parser such as disclosed in GB-A-2269923 and EP-A-0737928 for example.

GB-A-2269923 and EP-A-0737928, the content of which are hereby incorporated by reference, disclose a particular form of parser which carries out the parsing operation using a particular form of grammar termed dependency grammar. Other examples of such a dependency parser are disclosed in "A Dependency Parser for English", Technical Reports, No. TR-1, Department of General Linguistics, University of Helsinki, March 1997, T. Järvinen and P. Tapanainen, and "A Nonprojective Dependency Parser" by P. Tapanainen and T. Järvinen, Proceedings of the Fifth Conference on Applied Natural Language Processing, Washington D.C., April 1997, Association for Computational Linguistics, the content of which is hereby incorporated by reference. A dependency parser parses the natural language to generate meaning data which comprises meaning representations for the words and links between them. The links indicate which meaning representations modify the meaning of other meaning representations and the links and types of links are determined having regard to the grammar of the natural language.

Thus once an instruction is entered into an apparatus using natural language, a meaning representation structure can be determined using a parser. In order for an apparatus to then interpret what instruction is to be carried out, the meaning data is compared to meaning data for one or more sets of reference data representing a phrase, sentence or passage of the natural language. By this comparison it can be determined whether the meaning of the input instruction matches the meaning of any of the reference data. If a match in the meanings is found then the apparatus can respond accordingly.

For example, if an apparatus controls the switching of a light, the entered instruction could be "turn off the light on the second floor" and the reference phrase to which it has to be matched in order for the light to be turned on is "switch the light on the second floor off". A simple word matching operation will not succeed since the words and syntax are different in the respective phrases. If however the meaning of the two phrases is analysed, the meanings can be matched. Another area where such a problem is encountered is in the area of database searching. Typically databases are searched using key words. The accuracy of database searches can be greatly enhanced if a meaning analysis is used together with meaning matching.

In GB-A-2269923 and EP-A-0737928, the method of responding to an input instruction in a natural language requires the parsing of the input instruction and then the application of a knowledge-based reasoner. This technique is however limited in that a knowledge base having a set of facts must be used.

Another method of matching phrases of a natural language is disclosed in an article by C. Schwarz entitled "Automatic Syntactic Analysis of Free Text" in Journal of the American Society for Information Science, September 1990, pages 408–417. In the technique disclosed by Schwarz, noun phrases are identified in the natural language passages to be matched and they are selected for parsing. The parsed noun phrases are normalised so that the meaning representation structure is fitted to standard or common dependency structures. Noun phrase matching then takes place by a straightforward comparison of the normalised meaning representation structures in order to identify identical paths and nodes.

Whilst this phrase matching technique benefits from the ability to match the meaning representation structures, it suffers from the disadvantage that only noun phrases can be matched. Further, the normalisation process is complex and can result in the loss of information i.e. a distortion of the meaning.

It is therefore an object of the present invention to provide an apparatus and method for linguistic processing wherein input data representing a phrase, sentence, or passage of a natural language can be input and matched to reference data representing a phrase, sentence, or passage in the natural language using a meaning analysis in a more efficient and accurate manner then heretofore disclosed.

In accordance with one aspect the present invention provides a method and apparatus for providing a user interface allowing a user to enter data representing a natural language in order to cause the apparatus to carry out an operation. Such an operation can for example comprise the retrieval of data, the routing of the input data, or the carrying out of instructions given by the meaning of the input data. The data may be input into the apparatus in any of a number of ways such as by speech, whereby speech recognition generates text data, optical character recognition of a document whereby text data is generated, simple entry of text data, or the transference of text data from a remote apparatus.

The input data is analysed to generate meaning data structured in computer usable form as lexical meaning representations and links therebetween having regard to the grammar of the natural language. The links indicate which of the lexical meaning representations modify other lexical meaning representations. Thus, preferably the present invention is implemented using a dependency parser. However, the present invention is not limited to such a form of parser and any parser can be used whereby the modification relationships can be derived.

The meaning data of the input data is then compared with meaning data for reference data. The meaning data for the reference data can either be determined each time it is to be compared from stored reference data, or the meaning data for the reference data can be determined beforehand and stored ready for comparison.

The comparison takes place by determining equivalent lexical meaning representations in the meaning data for the input data and the reference data linked by equivalent links, starting from a head lexical meaning representation which does not modify any others, in accordance with a set of relationships defining equivalence between at least one of lexical meaning representations, linked lexical meaning representations, and links. Thus, the relationships define rules by which the equivalence can be determined. The process is an incremental or recursive process which incrementally or recursively determines equivalence along a chain of lexical meaning representations for the input data and the reference data. The chain comprises a plurality of lexical meaning representations sequentially linked together by the links which identify which lexical meaning representations modify or are modified by other lexical meaning representations. Many different rules of equivalence can be used and the form of these rules will depend upon the grammar and accuracy of the matching required between the input data and the reference data.

Dependent upon the degree of equivalence between the input data and the reference data, the apparatus can then carry out an operation e.g. determine whether, or to what degree, the input data matches the meaning of the reference data, or identify a set of reference data which has the highest equivalence in meaning to the input data, whereby the resultant operation can be the results of the match displayed on the screen or the implementation of an instruction for responding to reference data which best matches the meaning of the input data.

Thus in accordance with this aspect of the present invention by identifying the head lexical meaning representation of the input meaning data and recursively determining equivalence in the chain linked lexical meaning representations, a less computationally intensive, more general and accurate matching technique compared with the prior art is provided.

In accordance with a further aspect of the present invention there is provided a method of generating a machine executable instruction, the method comprising the steps of:

inputting data representing a phrase, sentence, or passage of a natural language;

analysing said input data to generate meaning data structured in computer usable form as lexical meaning representations and links therebetween having regard to the grammar of the natural language, said links indicating which of said lexical meaning representations modify others of said lexical meaning representations;

comparing the meaning data for the input data with meaning data for reference data by determining equivalent lexical meaning representations in said meaning data for the input data and the reference data linked by equivalent links starting from a head lexical meaning representation which does not modify any others of said lexical meaning representations in said lexical meaning data for the input data in accordance with a set of relationships defining equivalence between at least one of lexical meaning representations, linked lexical meaning representations, and links; and generating a machine executable instruction in dependence upon the result of the comparing step.

This aspect of the present invention also provides apparatus for generating a machine executable instruction, the apparatus comprising:

input means for inputting data representing a phrase, sentence or passage of a natural language.

analysing means for analysing said input data to generate meaning data structured in computer usable form as lexical meaning representations and links therebetween having regard to the grammar of the natural language, said links indicating which of said lexical meaning representations modify others of said lexical meaning representations;

comparing means for comparing the meaning data for the input data with meaning data for reference data by determining equivalent lexical meaning representations in said meaning data for the input data and the reference data linked by equivalent links starting from a head lexical meaning representation which does not modify any others of said lexical meaning representations in said lexical meaning data for the input data in accordance with a set of relationships defining equivalence between at least one of lexical meaning representations, linked lexical meaning representations, and links; and generating means for generating a machine executable instruction in dependence upon the result of the comparing step.

In this aspect of the present invention a machine executable instruction can be generated from input text in a natural language. This provides a convenient user interface whereby user's need not learn specific standard instructions and instead can use instructions which are intuitively correct but which may not exactly match the reference text phrases.

The lexical meaning representations represent the meaning of a set of words. Such a set of words can comprise a number of different parts of speech and comprise any set of words which can be considered to convey an idea.

The links can define any modification relationship between the linked lexical meaning representations. The links can indicate the semantic relationships of the lexical meaning representations and/or they can comprise specifiers.

In an embodiment the comparing step comprises identifying a first lexical meaning representation in the meaning data for the input data, identifying any corresponding first lexical meaning representation in the meaning data for the reference data, identifying a second lexical meaning representation which modifies the first lexical meaning representation, identifying any corresponding second lexical meaning representation linked to the identified corresponding first lexical meaning representation in the meaning data for the reference data, determining the equivalence of any linked first and second lexical meaning representations in the meaning data for the input data and the reference data according to the set of relationships, and if an equivalence is found, repeating the identifying steps and the determining step for each of $(n+1)^{th}$ lexical meaning representations which modifies each $n^{th}$ lexical meaning representation until no equivalence is found.

In an embodiment for comparing linked lexical meaning representations, the equivalent lexical meaning representations are identified in the input meaning data and the reference meaning data and connections are registered between them. The step of identifying linked pairs of lexical meaning representations then comprises sequentially identifying lexical meaning representations for which there are registered connections between input meaning data and reference meaning data and for which there are equivalent links therebetween.

The machine executable instructions generated can be dependent upon the number of determined equivalent linked lexical meaning representations. For instance, a match may only be registered if all of the linked lexical meaning representations in the input meaning data have equivalent linked lexical meaning representations in the reference meaning data. Alternatively, a threshold number of equated linked lexical meaning representations can be chosen to trigger matching.

In an embodiment the set of relationships give a score for the equivalence where a high score indicates a good match and a low score indicates a poor match. The equivalence of the linked lexical meaning representations is then determined as an accumulated score and the match is dependent upon this accumulated score. Alternatively a poor match could accrue a high penalty compared to a good match and thus a good match is indicated by a low accumulated penalty score.

Scores may be given for many different relationships. For instance, the occurrence of a particular lexical meaning representation can be given a score: less distinctive lexical meaning representations having a higher score than more distinctive lexical meaning representations. The distinctiveness of particular lexical meaning representations can be determined from the frequency of occurrence as well as other factors. For example, in an embodiment used for retrieving images the words "picture" and "image" are not very distinctive since they are common words in the application domain. However, in terms of general language use they are not particularly frequent words.

The lexical meaning representations comprise a set of possible words which have the ascribed meaning. Each lexical meaning representation may be divided into sub-lexical meaning representations i.e. more specific lexical meanings which can in turn be divided into the specific words. Further, groups of words within the set of words which fall within the lexical meaning representation can be divided into different types e.g. parts of speech. The occurrence of any sub-lexical meaning or type can also be given a particular score depending upon its frequency of occurrence having regard to the application or some other parameter.

The set of relationships can also give scores for the equivalence of the types of each lexical meaning representation. For example, although the same lexical meaning representation may appear in the input meaning data and the reference meaning data, for the input meaning data the type may comprise the verb part of speech whilst in the reference meaning data the type may comprise the noun part of speech. Although the lexical meaning representations are the same, because they are derived from different parts of speech, the equivalence score may be reduced accordingly.

The set of relationships can also give scores for the equivalence of types of links between lexical meaning representations. The types of links are dependent upon the pair of lexical meaning representations forming the ends of the links and the grammar of the natural language. The relationship may define one or more links as being equivalent to multiple links which skip over one or more intermediate lexical meaning representations. If such equivalents are given, the score for the equivalence may be reduced. The reduction in score may be dependent upon the number of links in the multiple link.

In order to ensure accurate matching, in one embodiment the method also takes into account negation in the input data and the reference data. Negation is detected in the lexical meaning representations linked to the determined equivalent linked lexical meaning representations in the meaning data for the reference data and the accumulated score is reduced if negation is detected.

Preferably the lexical meaning representations in the meaning data for the input data and the reference data which have no significant content are not used for the determination of equivalence. For example such lexical meaning representations can comprise prepositions, pronouns, intensifiers and determiners.

Where the lexical meaning representation structure includes branches i.e. a lexical meaning representation of the meaning data for the input data and/or the reference data is modified by more than one other lexical meaning representation, the equivalence of the chain linked lexical meaning representations is determined for each branch in turn and if an accumulated score is being used, a product of the scores for the branches is determined as the final score for the equivalence.

In accordance with a further aspect the present invention provides a method of recognising data in computer usable form, the method comprising the steps of:

inputting data representing a phrase, sentence or passage of a natural language;

analysing said input data to generate meaning data structured in computer usable form as lexical meaning representations and links therebetween having regard to the grammar of the natural language, said links indicating which of said lexical meaning representation modify others of said lexical meaning representations;

comparing the meaning data for the input data with meaning data for reference data by repeatedly determining equivalent chain linked pairs of lexical meaning representations in said meaning data for the input data and the reference data starting at a head lexical meaning representation in the meaning data for the input data and in accordance with a set of relationships defining equivalence between at least one of lexical meaning representations, linked lexical meaning representations, and links; and recognising the meaning data for the input data in accordance with the result of the comparison.

This aspect of the present invention also provides recognition apparatus comprising input means for inputting data representing a phrase, sentence, or passage of a natural language;

analysing means for analysing said input data to generate meaning data structured in computer usable form as lexical meaning representations and links therebetween having regard to the grammar of the natural language, said links indicating which of said lexical meaning representations modify others of said lexical meaning representations;

comparing means for comparing the meaning data for the input data with meaning data for reference data by repeatedly determining equivalent chain linked pairs of lexical meaning representations in said meaning data for the input data and the reference data starting at a head lexical meaning representation in the meaning data for the input data and in accordance with a set of relationships defining equivalence between at least one of lexical meaning representations, linked lexical meaning representations, and links; and recognition means for recognising the meaning data for the input data in accordance with the result of the comparison.

In this aspect of the present invention the input data is recognised by determining its meaning and comparing its meaning with the meaning of reference data.

In one embodiment the meaning data of the input data is compared with a plurality of sets of reference data and the recognising step comprises identifying the set of reference data for which the meaning data best matches the meaning data for the input data.

In an embodiment the step of determining equivalent chain linked pairs of lexical meaning representations includes an initial step of identifying equivalent lexical meaning representations in the meaning data for the input data and the reference data, and registering an equivalence between the identified equivalent lexical meaning representations, wherein the equivalent chain linked pairs of lexical meaning representations are determined using the registered equivalences, said links, and said set of relationships.

In accordance with yet another aspect of the present invention there is provided apparatus for matching input data representing a phrase, sentence or passage of a natural language with one or more sets of reference data representing a phrase sentence or passage of the natural language, the apparatus comprising input means for inputting the input data and the reference data;

analysing means for analysing the input data and the reference data to generate input meaning data and reference meaning data respectively structured as lexical meaning representations and links therebetween having regard to the grammar of the natural language, said links indicating which of said lexical meaning representations modify others of said lexical meaning representations;

comparing means for comparing the input meaning data and the reference meaning data by identifying a head lexical meaning representation in the input meaning data which does not modify any other lexical meaning representations and an equivalent lexical meaning representation in the reference meaning data and determining equivalent lexical meaning representations in the input meaning data and the reference meaning data chain linked to the head lexical meaning representation or its equivalent respectively, the equivalence being determined using a set of relationships defining equivalence between at least one of lexical meaning representations, linked pairs of lexical meaning representations, and links; and matching means for determining the match between the input data and the or each set of reference data based on the output of the comparing means.

Also in accordance with this aspect of the present invention there is provided a method of matching input data representing a phrase, sentence, or passage of a natural language with one or more sets of reference data representing a phrase, sentence, or passage of the natural language, the method comprising the steps of:

analysing the input data and the reference data to generate input meaning data and reference meaning data respectively structured as lexical meaning representations and links therebetween having regard to the grammar of the natural language, said links indicating which of said lexical meaning representations modify others of said meaning representations;

comparing the input meaning data with the reference meaning data by identifying a head lexical meaning representation in the input meaning data which does not modify any other lexical meaning representations identifying an equivalent lexical meaning representation in the reference meaning data, and determining equivalent lexical meaning representations in the input meaning data and the reference meaning data chain linked to the head lexical meaning representation or its equivalent respectively, the equivalence being determined using a set of relationships defining equivalence between at least one of lexical meaning representations, linked pairs of lexical meaning representations, and links; and determining the match between the input data and the or each set of reference data based on the result of the comparison step.

In this aspect of the present invention a match is determined between the meaning of the input data and the meaning of one or more sets of reference data.

A match can be found between the input meaning data and the reference meaning data when a certain number e.g. all or a threshold number of linked lexical meaning representations are determined to be equivalent in the input meaning data and the reference meaning data. Alternatively, where an accumulated score is used a match can be identified when a certain threshold accumulated score is reached or one or more sets of reference data associated with the highest accumulated scores can be selected as the best match or matches. In another embodiment where a penalty score is used, a match can be chosen which has a lowest penalty score derived from accumulating penalty scores where a poor match between equivalent lexical meaning representations is assigned a higher penalty score than a good match.

The results of the match can be the display of the identification of the set or sets of reference data ranked according to their accumulated probability. For example, where searching a database, and the query matches the key which comprises an abstract for example, the retrieved or displayed information may comprise information associated with the reference data. Such information can comprise a title and bibliographic information or where the reference data comprises a description of for example images, the retrieved information can comprise the image itself or information on the image such as its file name.

Embodiments of the present invention will now be described with reference to the accompanying drawings in which.

Figure 1:
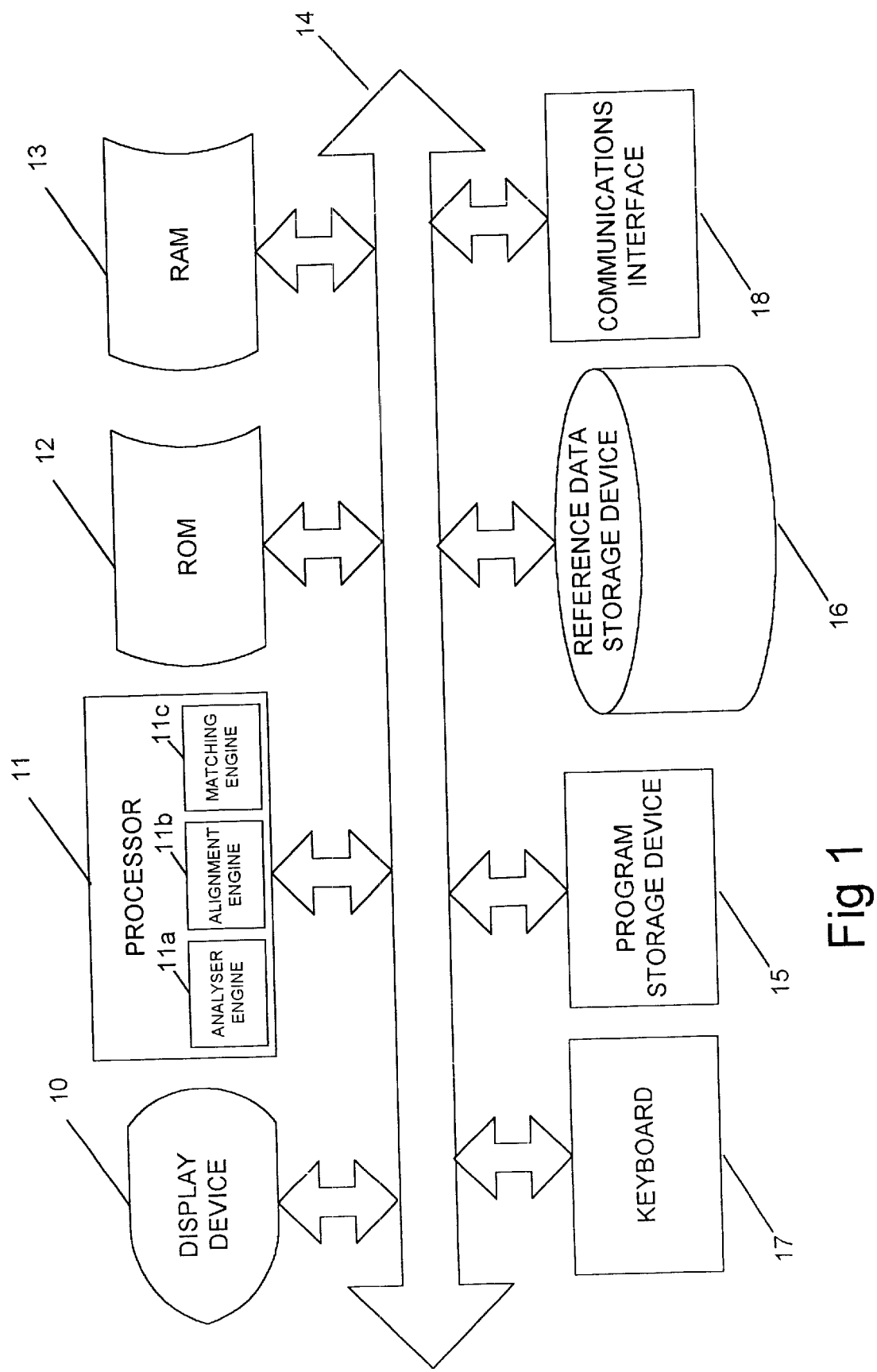
FIG. 1 is a schematic diagram of the hardware in accordance with an embodiment of the present invention.

FIG. 1 illustrates the hardware of an embodiment of the present invention which comprises computer apparatus wherein a display device 10 is provided for displaying the input data as it is input. A processor 11 comprises an analyser engine 11a, an alignment engine 11b and a matching engine 11c. Read only memory (ROM) 12 is provided for storing the conventional firmware i.e. BIOS etc. A random access memory (RAM) 13 is provided as a working memory for use by the processor 11. The keyboard 17 is provided for operation by a user when interfacing with the apparatus in order to enable data to be input. Although in this embodiment a keyboard is shown as the input device, any other means of entering data representing a natural language can be used e.g. a speech recognition interface, or optical character recognition interface, or an interface to external apparatus for inputting the data into the apparatus.

A program storage device 15 is provided for storing the programs which will be used by the processor for implementing the present invention. The storage device can take any conventional form such as a fixed magnetic "hard" disc, optical disc, magnetic tape drive, programmable read only memory, and a removable magnetic "floppy" disc.

A reference data storage device 16 is also provided for storing the reference data for matching with the input data. Also, a communication interface 18 is provided to allow a reference data to be retrieved from external apparatus e.g. over a local area network (LAN), a wide area network (WAN) or over the internet. Thus, the communications interface 18 can be provided in addition to or alternatively to the reference data storage device 16.

All of the elements of the apparatus are interconnected via a communications and data bus 14 to allow the passage of control signals and data therebetween.

It will thus be apparent that the present invention can be embodied as a programmed computer and thus the present invention can be embodied as a computer program stored on a computer readable storage medium. Such a storage medium can comprise any conventional storage medium such as an optical disc, a magnetic disc or tape, or an electronic memory device such as programmable read only memory (PROM). Since the computer program can be obtained as an encoded signal e.g. by downloading the code over the internet, the present invention can also be embodied as an encoded signal carrying processor implementable instructions for controlling a processor to carry out the method as hereinafter described.

Figure 2:
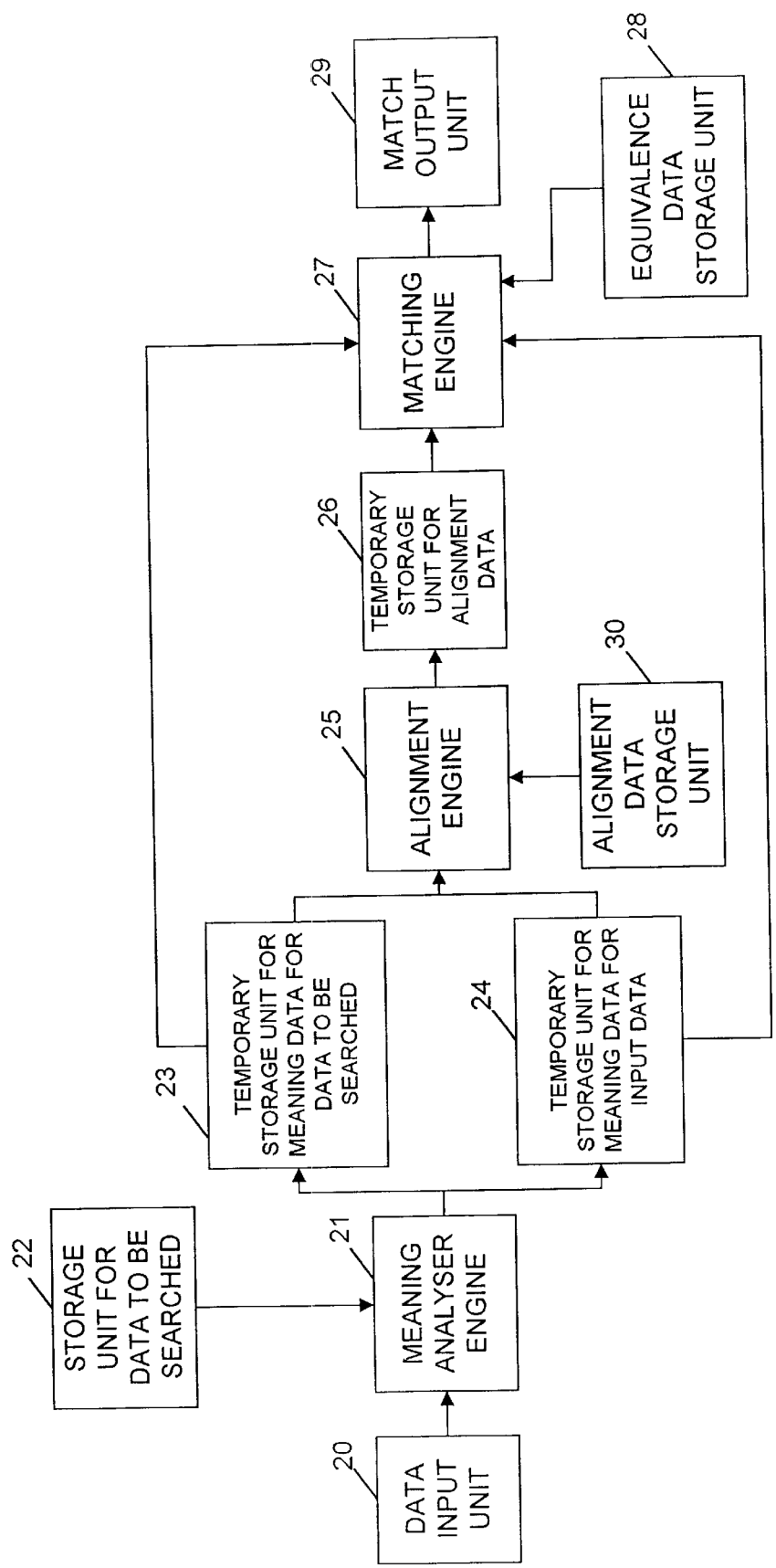
FIG. 2 is a schematic diagram of a first embodiment of the present invention.

FIG. 2 is a schematic illustration of a first embodiment of the present invention wherein data representing a phrase, sentence, or passage of a natural language is input by the data input unit 20 into a meaning analyser engine 21. A storage unit 22 is provided for storing reference data representing a phrase, sentence, or passage of a natural language to be searched. The storage unit would usually contain a number of sets of reference data to which the input data is to be matched. The data in the storage unit 22 is input into the meaning analyser engine 21 so that meaning data for the data to be searched is generated and input into a temporary storage unit 23 and meaning data for the input data is generated and input into the temporary storage unit 24.

The meaning data from the temporary storage units 23 and 24 is then read into an alignment engine 25 in order to determine equivalent lexical meaning representations within the meaning data and to register links therebetween. An alignment data storage unit 30 is provided for storing data indicating which lexical meaning representations are equivalent and can therefore be aligned. This data is input into the alignment engine 25 to allow the determination of equivalence and the registration of links. The registered links are stored within the temporary storage unit 26 as alignment data and this is then passed to the matching engine 27 together with the meaning data from the temporary storage units 23 and 24. There is further provided an equivalence data storage unit 28 which stores the equivalence relationships. These are input into the matching engine 27 which determines a match between the meaning data for the input data and the reference data. The result of the match is passed to a match output unit 29 for the outputting of the result of the match.

Although in this embodiment the alignment engine 25 and the matching engine 27 are illustrated as being separate and carry out a first step of aligning meaning representations in the alignment engine 25 and then a second step of determining the equivalence of the linking of the lexical meaning representations in the matching engine 27, the functions could equally well be carried out in a single unit in one process.

Figure 3:
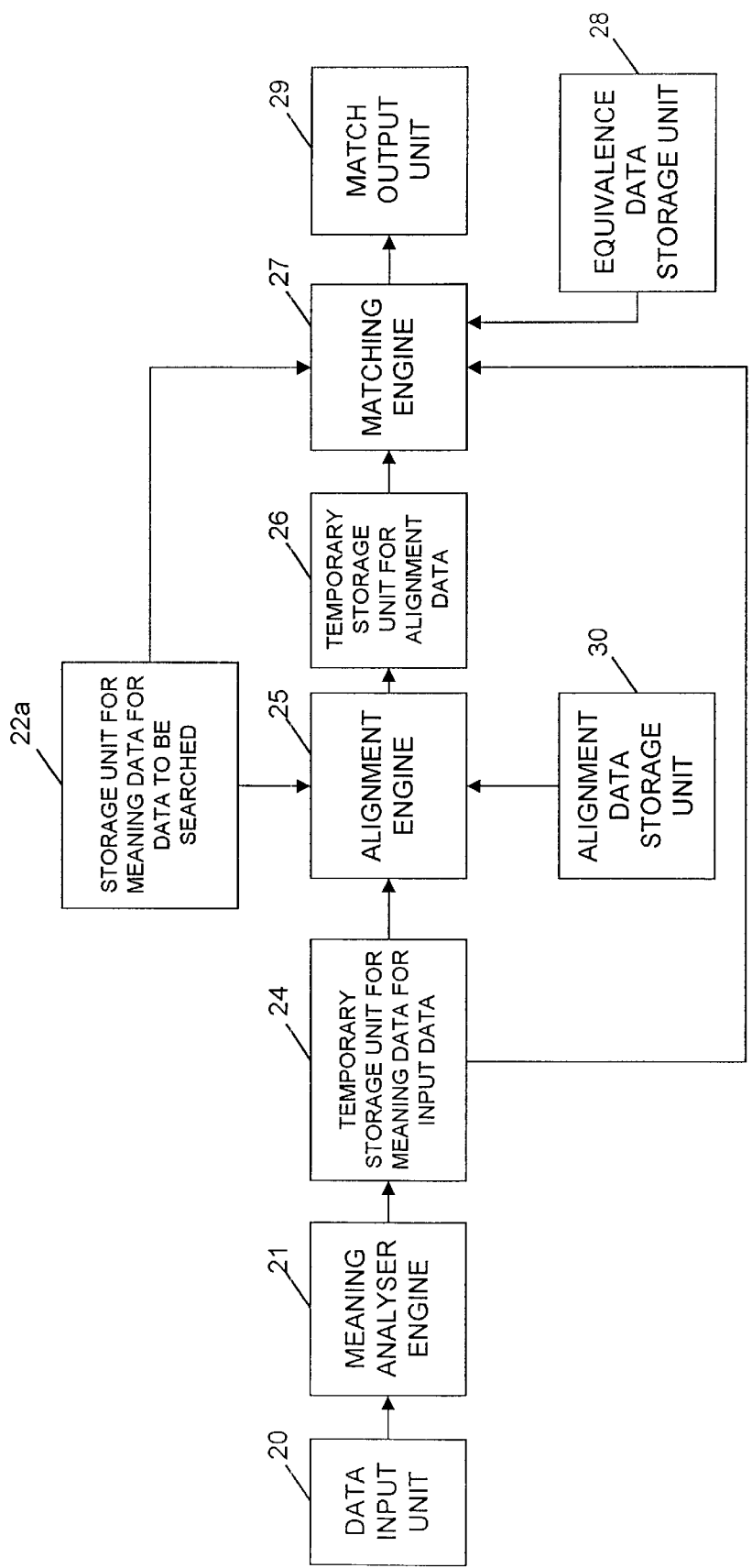
FIG. 3 is a schematic drawing of a second embodiment of the present invention.

Although in FIG. 2 it is illustrated that the data to be searched is input into the analyser engine 21 so that every time data is input the analyser must perform the meaning analysis on the reference data, this is not essential. FIG. 3 illustrates a second embodiment of the present invention wherein there is a permanent storage unit 22 a for the meaning data for the data to be searched. Thus, the meaning analyser engine 21 need not be used in real time to analyse the reference data. This can be done at an initial or set-up phase. This arrangement therefore reduces the computational requirements for the meaning analyser engine 21 and can thus increase the speed of matching. However, it does require the content of the reference data not to change very often, if at all. Thus, the embodiment of FIG. 2 is appropriate where the reference data is dynamic whereas the embodiment of FIG. 3 is appropriate for circumstances where the reference data is static or at least static relative to the frequency of updating of the meaning data in the storage unit 22a.

Figure 4:
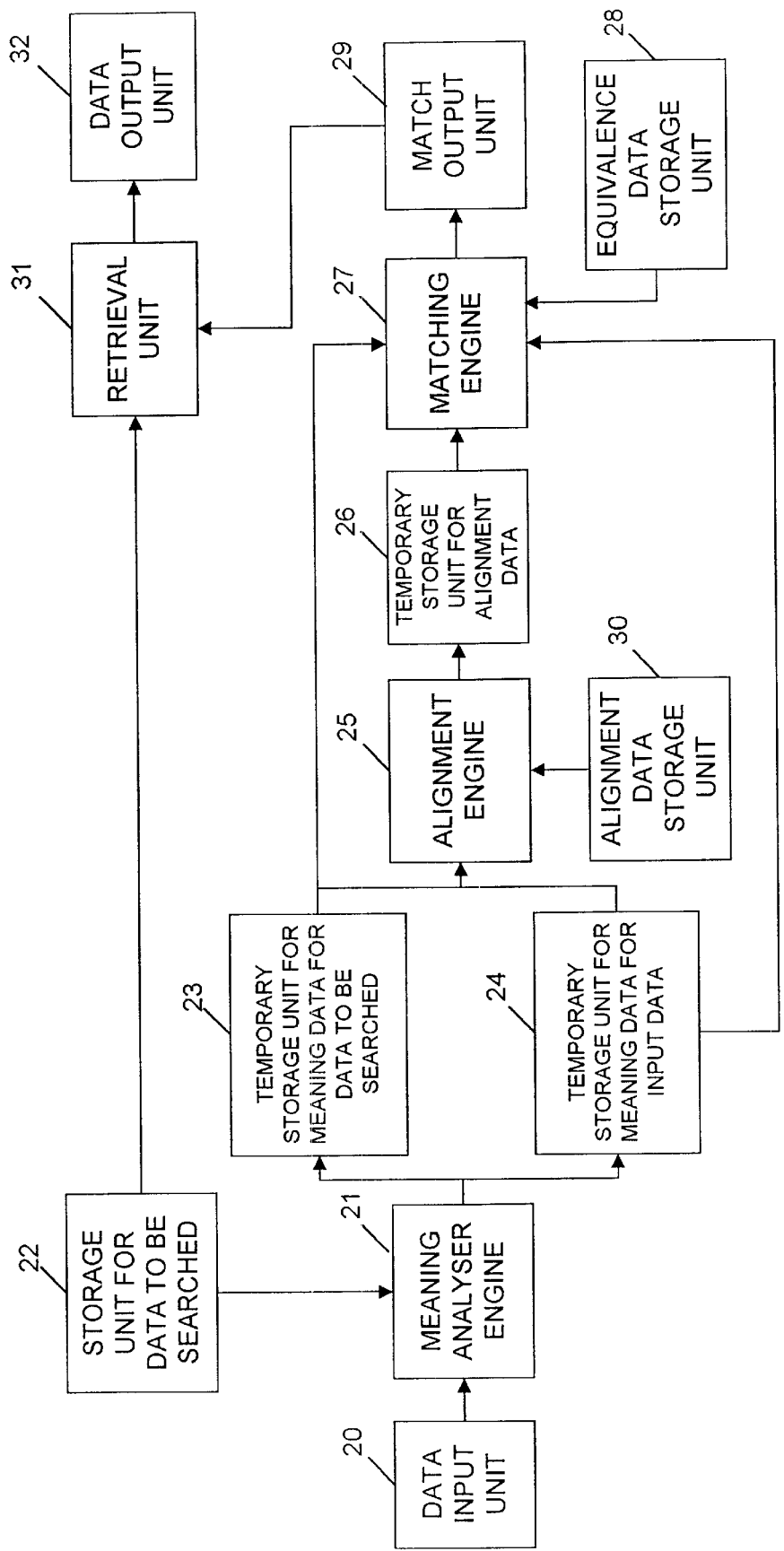
FIG. 4 is a schematic drawing of a third embodiment of the present invention.

FIG. 4 illustrates another embodiment of the present invention wherein the embodiment of FIG. 2 is incorporated in a data retrieval system. Since like reference numerals denote like elements of the apparatus, a description will only be given of the differences between the embodiments of FIG. 2 and the present embodiment.

The matching output unit 29 generates a signal dependent upon the result of the match carried out by the matching engine 27. This controls a retrieval unit 31 in order to direct it to retrieve the data for which a match has been found between the input meaning data and the reference meaning data. In response to the signal the retrieval unit 21 accesses the storage unit 22 and retrieves the data for output to the data output unit 32.

This embodiment of the present invention is applicable to a database retrieval system wherein the input data comprises a query in a natural language and the data stored in the storage unit 22 comprises a plurality of keys i.e. sets of text e.g. documents in the natural language. When a match in the meaning is found for the input data and one of the sets of reference data, the retrieval unit 31 is controlled to retrieve the identified set of reference data e.g. the document for output. The data output unit 32 can output the data in any one of a number of ways e.g. to a display, to a printer, or to a communications interface for the communication of the retrieved data to a remote apparatus.

Figure 5:
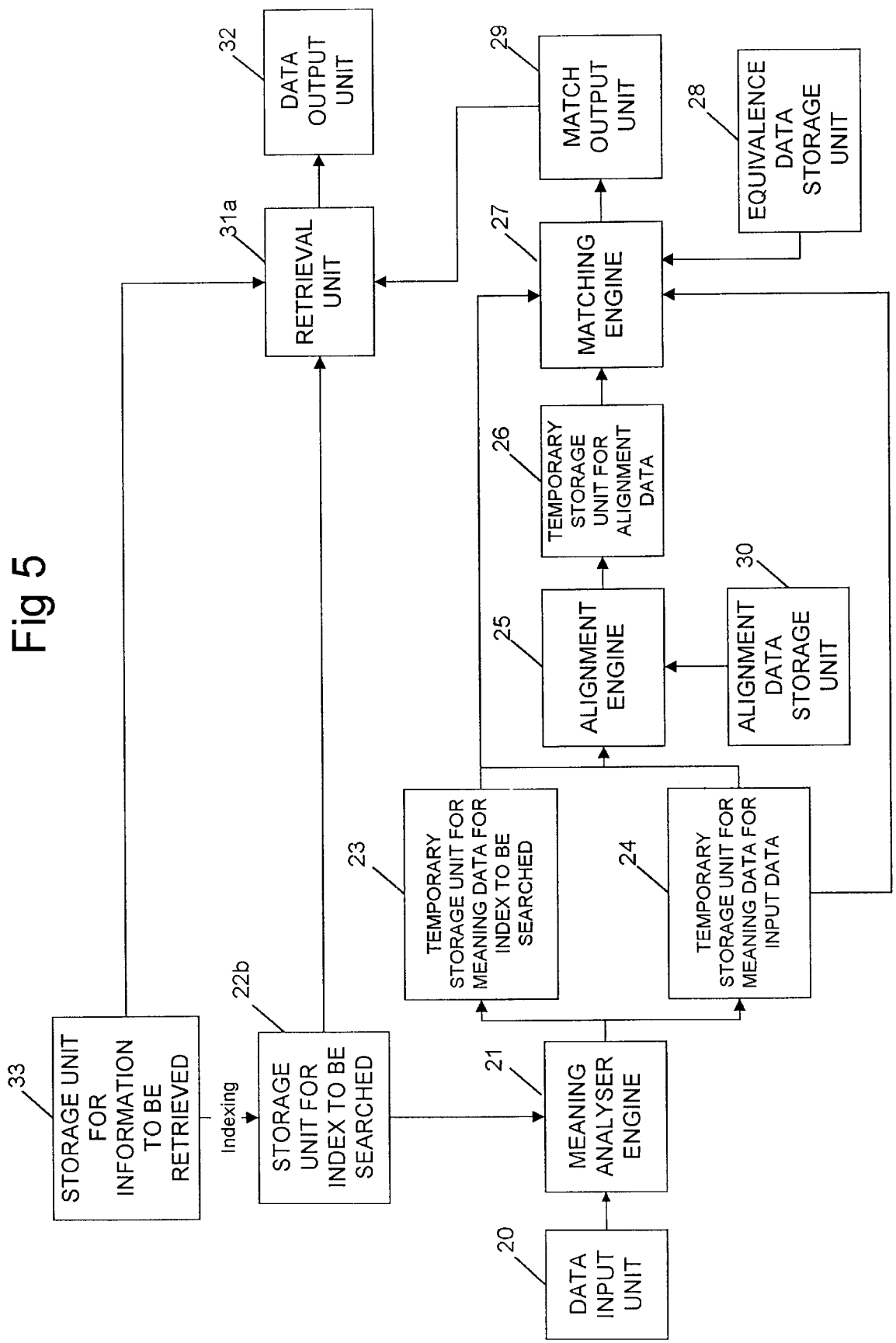
FIG. 5 is a schematic drawing of a fourth embodiment of the present invention.

FIG. 5 illustrates a modified embodiment of FIG. 4 wherein storage unit 22b stores data to be searched in the form of index data for information stored in a storage unit 33. The index data can for example be an abstract of a document stored in the storage unit 33, a title or other bibliographic information, or a description of information stored in the storage unit 33 e.g. a description of content of an image. Thus, the purpose of the data retrieval system is not to retrieve the indexing data in the storage unit 22*b* but instead to retrieve the information from the storage unit 33.

When a match signal is output from the match output unit 29, this controls the retrieval unit 31*a* to retrieve the index data from the storage unit 22*b* which includes information identifying the location of the required information in the storage unit 33*b*. Using this information retrieval unit 31*a* can retrieve the information identified by the index data from the storage unit 33 and this can be output to the data output unit 32. The information can then be output in any one of a number of different ways e.g. to the screen of the computer of the user, to a printer, or to a remote apparatus.

Figure 6:
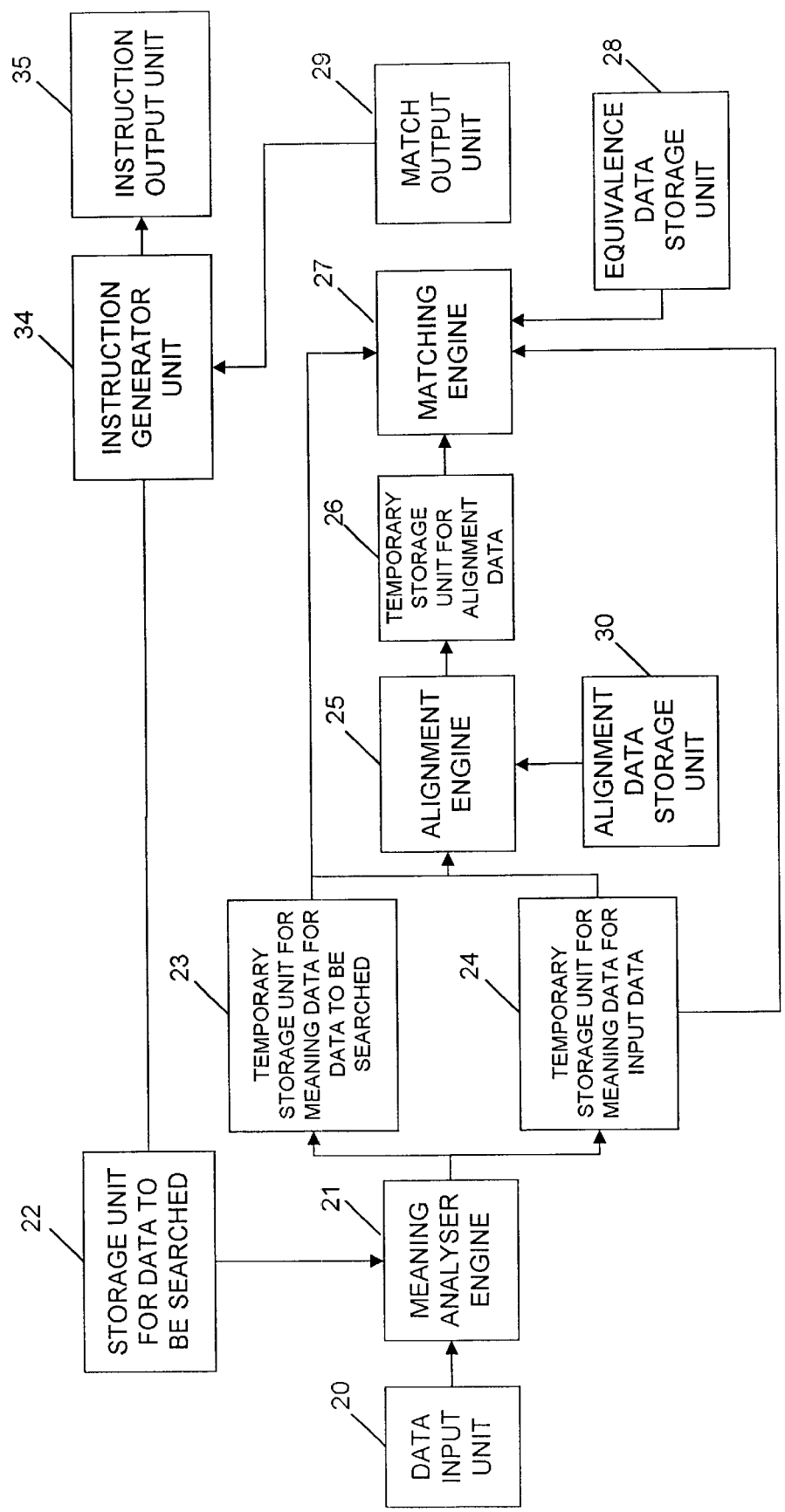
FIG. 6 is a schematic drawing of a fifth embodiment of the present invention.

FIG. 6 illustrates a further embodiment of the present invention in which the embodiment of FIG. 2 is incorporated within an apparatus for generating computer executable instructions.

In this embodiment the output of the match output unit 29 is passed to an instruction generator unit 34 to control the generation of instructions. The instruction generator unit refers to the storage unit 22 which stores not only the data to be searched in the form of a description of the operation to be carried out in the natural language, but also an identification of the instruction to be generated. The instruction generator unit identifies the instruction to be generated by reference to the storage unit 22 and thus generates an instruction which is passed to the instruction output unit 35.

Thus in this embodiment the storage unit 22 stores a series of instructions in the natural language together with a computer identifiable action to be carried out that can be interpreted by the instruction generator unit 34.

Figure 7:
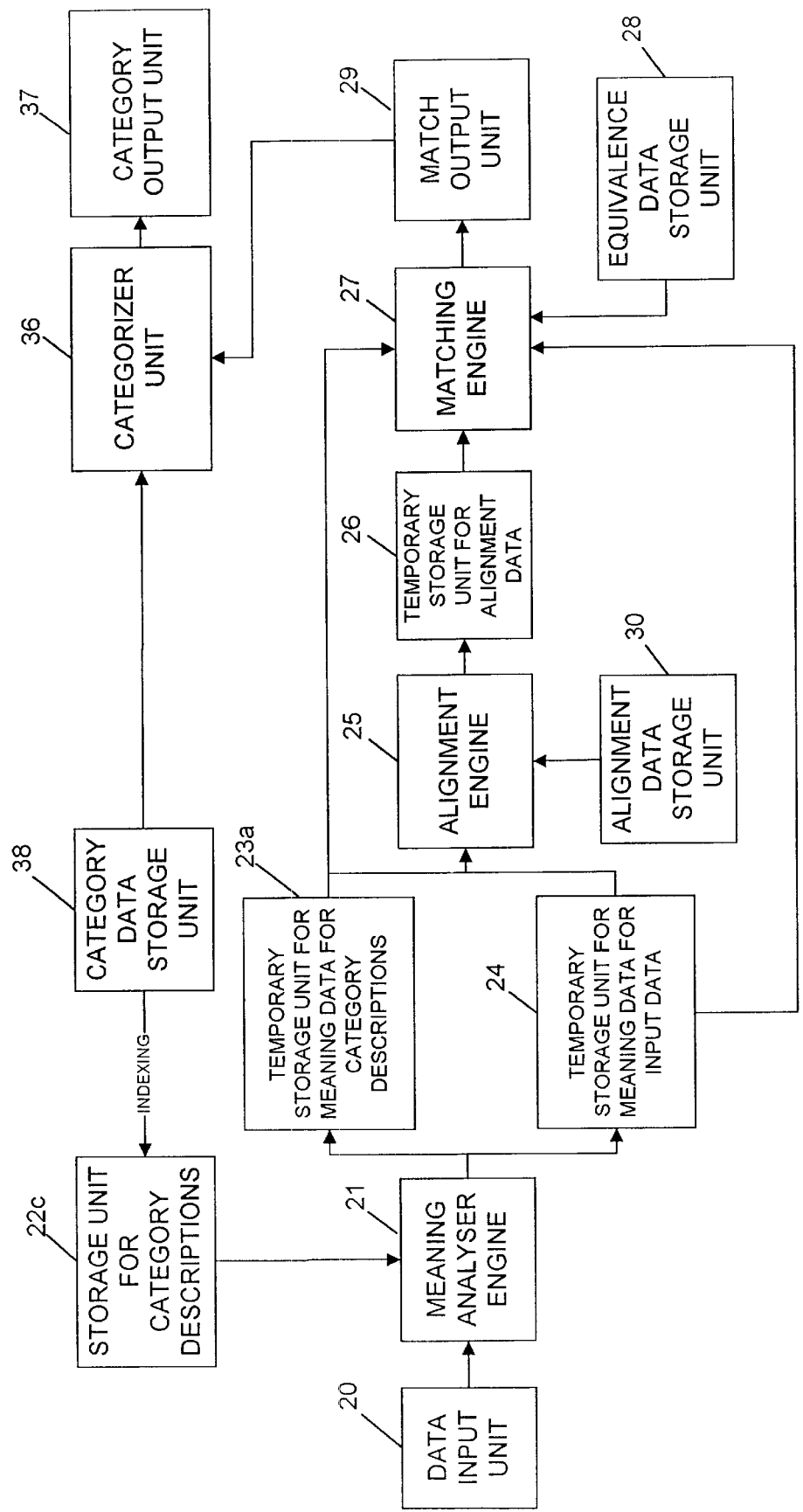
FIG. 7 is a schematic drawing of a sixth embodiment of the present invention.

FIG. 7 illustrates another embodiment of the present invention for identifying the category to which the input data belongs. In this embodiment the storage unit 22*c* stores category descriptions and the temporary storage unit 23*a* stores meaning data for the category descriptions after analysis by the meaning analyser engine 21 of the category descriptions from the storage unit 22*c*. The storage unit 22*c* stores descriptions for the category data stored in the category data storage unit 38. When the match output unit 29 indicates a match, the categoriser unit 36 is controlled to retrieve the category data from the category data storage unit 38 and to send this to the category output unit 37.

Thus in this embodiment of the present invention data can be classified or categorised. For instance, the category output unit 37 can output the identified category onto a display to identify to a user the category to which the input data belongs.

Figure 8:
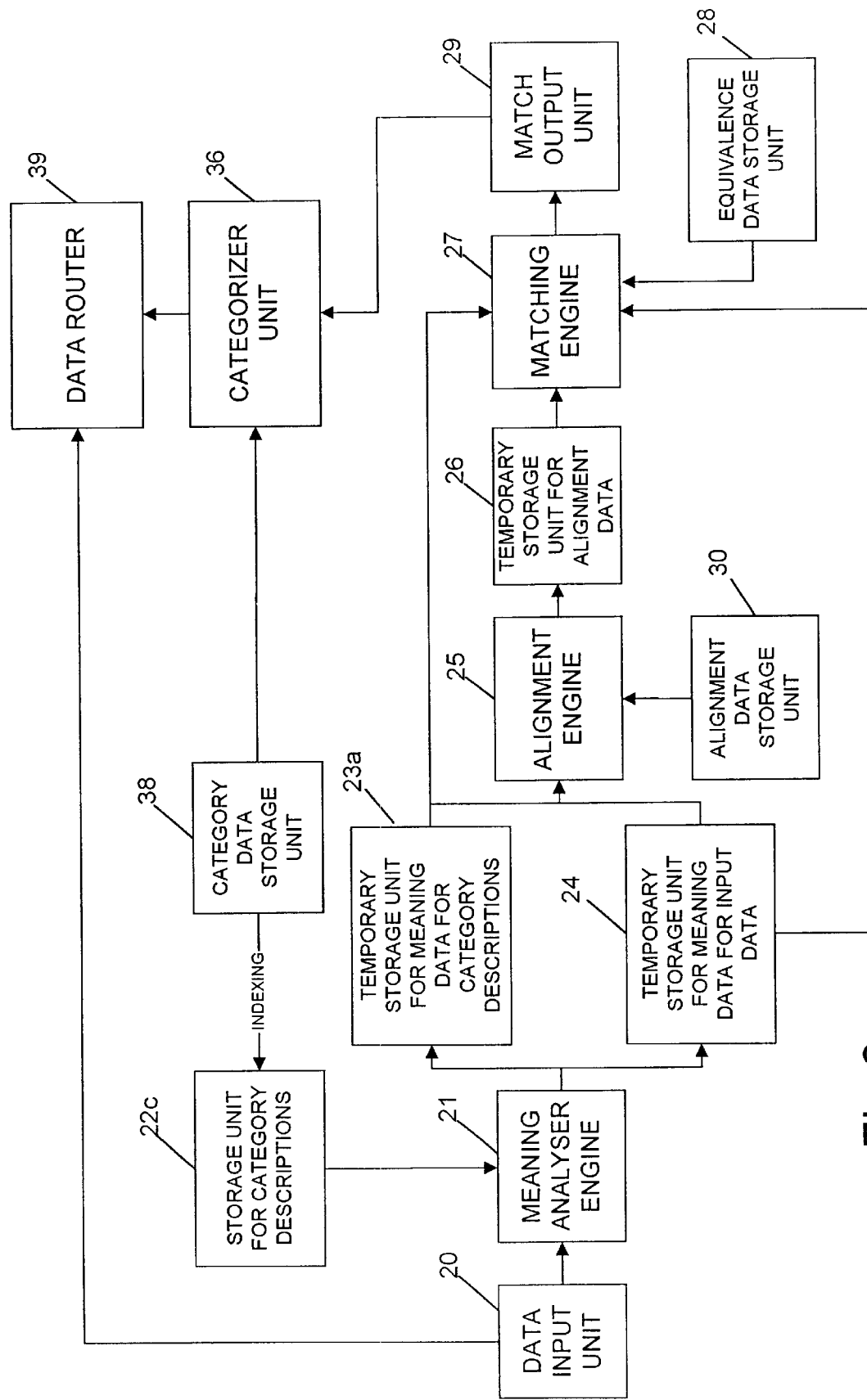
FIG. 8 is a schematic drawing of a seventh embodiment of the present invention.

FIG. 8 is an extension to the embodiment of FIG. 7 wherein instead of the category merely being output by the category output unit 37, a data router 39 is provided to receive the data input by the data input unit 20. The output of the categorising unit 36 which comprises the identified category is input into the data router 39 in order to control the routing of the input data. Thus for example if the input data comprises text in a particular subject area, this can be identified as lying within a subject category and the data can be routed accordingly e.g. to be stored in a particular location. Thus this embodiment provides a method for automatically sorting data such as documents. In particular, this provides a method of automatically sorting documents which have been optically character recognised so that these can be stored appropriately in dependence upon the subject of the content of the documents.

Figure 9:
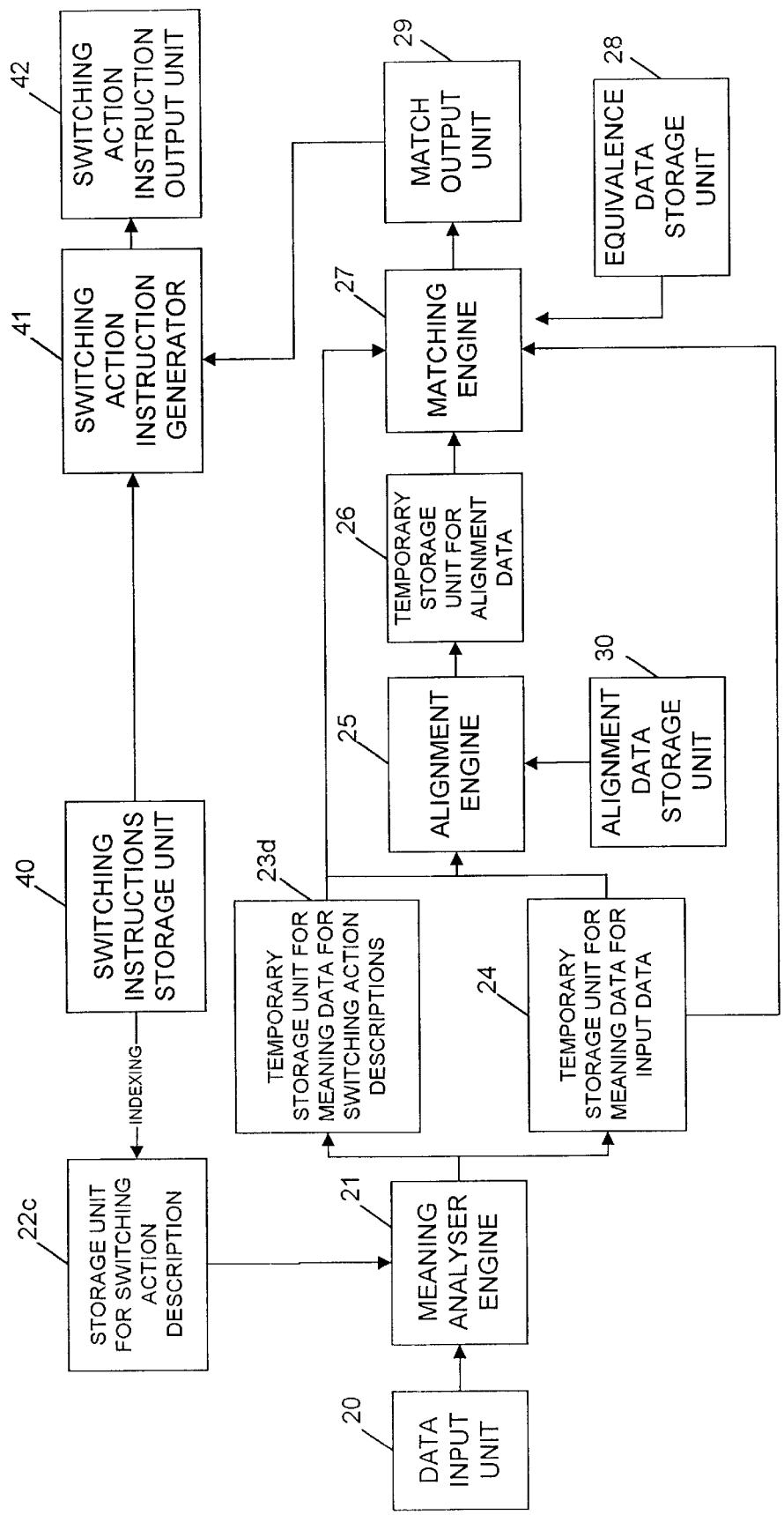
FIG. 9 is a schematic drawing of an eighth embodiment of the present invention.

FIG. 9 illustrates yet another embodiment of the present invention for causing a switching action. This embodiment is similar to the embodiment of FIG. 6. In this embodiment the storage unit 22*c* stores switching action descriptions which describe switching instructions which are stored in the storage unit 40. The temporary storage unit 23*d* stores meaning data for the switching action descriptions generated by the analysis of the switching action descriptions by the meaning analyser 21.

When a match is output from the match output unit 29, switching action instruction generator 41 is controlled to retrieve the appropriate switching instructions from the storage unit 40 and these are output to the switching instruction output unit 42.

Figure 10:
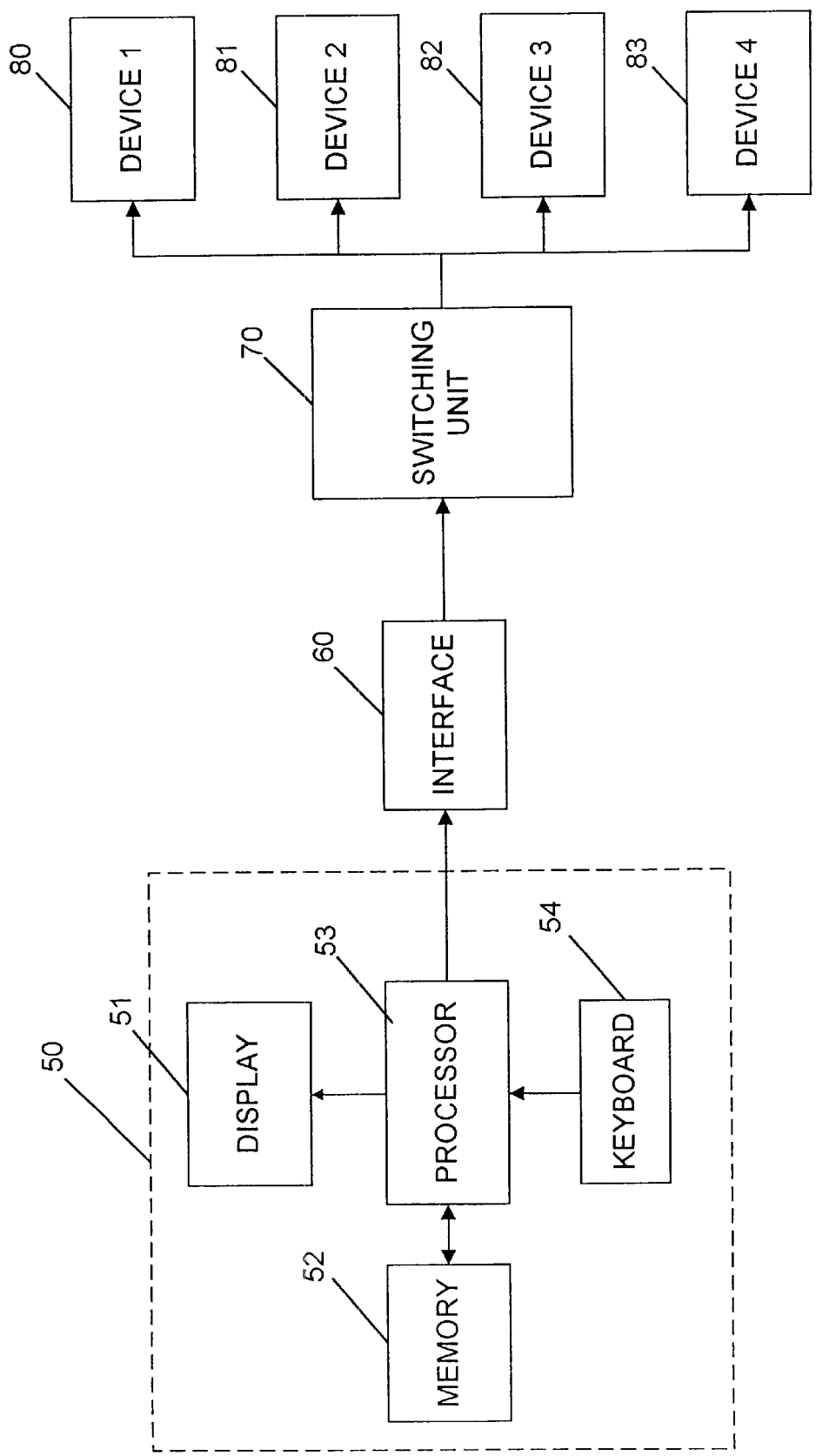
FIG. 10 is a drawing of a hardware implementation of the eighth embodiment of the present invention.

FIG. 10 illustrates a physical implementation of this embodiment. The apparatus illustrated in FIG. 9 is implemented in a computer apparatus 50 comprising a processor 53, a memory 52, a display 51 and a keyboard 54. The switching action instructions are output from the computer apparatus 50 via an interface 60 to a switching unit 70 whereupon the switching action instructions are implemented in order to switch any one of the devices 80, 81, 82 or 83 in accordance with the instruction.

It can thus clearly be seen that this embodiment provides for a method of allowing a user to enter instructions into a computer apparatus in order to cause the implementation of the instructions by the computer apparatus.

The method of analysing the input data and the reference data and matching the meaning data will now be described in detail.

Figure 11:
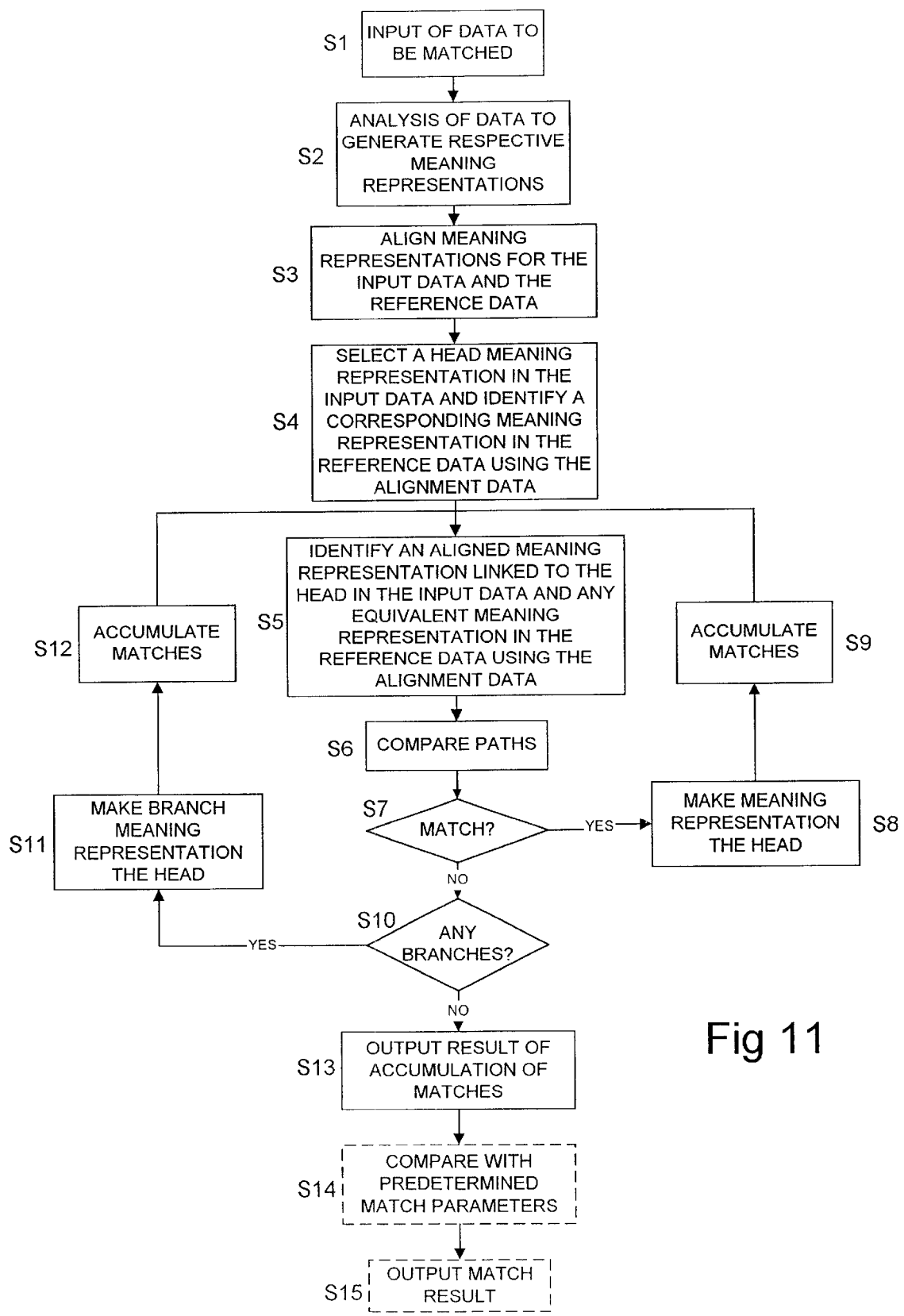
FIG. 11 is a flow diagram of the operation of an embodiment of the present invention.

FIG. 11 is a flow diagram of the steps taken in determining a match between the input data and the stored reference data. The input data or reference data comprise computer readable representations of a phrase, sentence, or passage of a natural language. Conventionally such a representation takes the form of text.

In step S1 the data to be matched is input and in step S2 this input data is analysed by the meaning analysis engine to generate meaning data. In this embodiment not only is the input data analysed but also the reference data so that respective meaning data is generated in step S2.

The analysis of step S2 comprises a parsing process which in this embodiment uses dependency grammar. Any parser can be used which generates lexical meaning representations and modification information from which links can be generated between the lexical meaning representations identifying which lexical meaning representations modify the meaning of which lexical meaning representation. Such a parser can be of the form described in GB-A-2272091, EP-A-0737928, or in the article by T. Järvinen and P. Tapanainen entitled "A Dependency Parser for English" mentioned hereinabove. The parser generates meaning data in the form of lexical meaning representations and meaning modification information from the input phrase, sentence, or passage in a natural language. The lexical meaning representations comprise a representation of a set of words which have the same meaning. The lexical meaning representations can be divided into subclassifications representing different types of meanings. For example a meaning representation "copy" can represent syntactic variants of the noun and verb e.g. "copy" (noun or verb), "copies" (noun or verb), "copying" (verb), or "copied" (verb). Also it can represent the derivative variants "copier" and "copyist".

The level of the lexical meaning representations depend upon the tables used within the parser defining equivalence between words and the meaning representations. In its simplest form a lexical meaning representation can actually represent the word itself. Any level of lexical meaning representation can be used.

The links between the lexical meaning representations identify the modification relationship between the lexical meaning representations. The minimum information required for the present invention is the direction of modification i.e. which of the linked pairs of lexical meaning representations is being modified.

The parser used in this embodiment of the present invention will now be described in detail. The parser is implemented as a computer program on a computer and is defined by a set of rules which are implemented by a functional programming language (Haskell). The parser acts sequentially on words as they are input to build up the meaning data sequentially. The parser used in this embodiment not only gives the direction of the links but also the types of links. The types of links are labelled with a relation e.g. subject, specifier, object. Table 1 below gives the rules implemented by the parser for linking types of lexical meaning representations and the types of links.

TABLE 1

| Part of speech for right hand meaning representation | Part of speech for left hand meaning representation | Link category and direction | Example |
|---|---|---|---|
| Nominal | Verb | Is Object | killed dog |
| Nominal | Preposition | Is PObject | with a bone |
| Nominal | Verb | Is Goal | give dog (a bone) |
| Nominal | Aux Be | Is Object | is a dog |
| Nominal | Aux Have | Is Object | has a dog |
| Nominal | Aux Modal | Is Object | will a dog |
| Nominal | Gerund | Is GObject | copying documents |
| Nominal | Gerund | Has NomNom | fishing permits |
| Noun \*\*has all the rules listed under Nominal, plus:\*\* | | | |
| Noun | Determiner | Has Specifier | the dog |
| Noun | PossPronoun | Has Specifier | his dog |
| Noun | Adjective | Has Modifier | happy dog |
| Noun | ConjN | Is RightConj | (cat) and dog |
| Noun | Noun | Is NomNom | prairie dog |
| Pronoun \*\*has all the rules listed under Nominal, and no more\*\* | | | |
| Complementiser | Noun | Has RelHead | man that . . . |
| RelPronoun | Noun | Has RelHead | man who . . . |
| RelPronoun | Preposition | Has RelHead | with which . . . |
| Verbal | Noun | Has Subject | dog barked |
| Verbal | Noun | Has Object | dog walked by a man |
| Verbal | Pronoun | Has Subject | he barked |
| Verbal | Adverb | Has Modifier | suddenly barked |
| Verbal | Complementiser | Has Subject | that barked |
| Verbal | RelPronoun | Has Relative | which walked |
| Verbal | To | Has Subject | copier to print paper |
| Verb \*\*has all the rules listed under Verbal, plus:\*\* | | | |
| Verb | Aux Modal | Is Complement | will bark |
| Verb | Aux Have | Is Complement | have barked |
| Verb | Aux Be | Is Complement | is barking |
| Verb | Complementiser | Has Object | that (the man) saw |
| Copula \*\*has all the rules listed under Verbal, plus:\*\* | | | |
| Copula | Aux Modal | Is Complement | will be |
| Copula | Aux Have | Is Complement | have been (happy) |
| Copula | Aux Be | Is Complement | is being |
| Aux Have \*\*has all the rules listed under Verbal, plus:\*\* | | | |
| Aux Have | Aux Modal | Is Complement | will have, will be |
| Aux Be \*\*has all the rules listed under Aux Have and Verbal, plus:\*\* | | | |
| Aux Be | Aux Have | Is Complement | have been (barking) |
| Aux Modal \*\*has all the rules listed under Verbal, and no more\*\* | | | |
| Adjective | Copula | Is Complement | is happy |
| Adjective | Intensifier | Has Specifier | very happy |
| Adjective | Adverb | Has Specifier | suddenly happy |
| Gerund | Adverb | Has Specifier | suddenly barking |
| Gerund | Preposition | Is PObject | for copying |
| Gerund | Noun | Has NomNom | colour copying |
| Gerund | Noun | Has Subject | copier making documents |
| Passive | Copula | Is Complement | is broken |
| Preposition | Noun | Has PSubject | dog with . . . |
| Preposition | Verb | Has PSubject | see with |
| Preposition | Gerund | Has PSubject | opying of documents |
| Preposition | Complementiser | Has Object | that (a man walked) on |
| To | Noun | Has PSubject | copier to print |
| Adverb | Verb | Is Modifier | bark suddenly |
| Adverb | Copula | Is Modifier | is suddenly |
| ConjN | Noun | Is LeftConju | cat and (dog) |
| Intensifier | Intensifier | Has Specific | very, very |

TABLE 1-continued

| Part of speech for right hand meaning representation | Part of speech for left hand meaning representation | Link category and direction | Example |
|---|---|---|---|

Example wording in each category:
Nominal - no examples, just gathers common properties of some other categories
Verbal - no examples, just gathers common properties of some other categories

| | |
|---|---|
| Noun | dog |
| Pronoun | he |
| Complementiser | that |
| RelPronoun | who |
| Verb | walk |
| Copula | is |
| Aux Have | have |
| Aux Be | be |
| Aux Modal | will |
| Adjective | happy |
| Gerund | copying |
| Passive | broken |
| Preposition | with |
| To | to |
| Adverb | suddenly |
| ConjN | and |

In Table 1 the type of link is indicated by the category and the direction of modification which is either given as Is which indicates the modification occurs left to right or Has which indicates that the modification occurs right to left. The table gives all of the possible types of links which could be formed. There are however constraints which prevent certain links being made.

There are several types of constraints.

Requirements

This type of constraint requires that a condition be met for particular types of links to be formed. Table 2 below gives the requirement for the form of a verb which is the part of speech for the right hand meaning representation using the terminology of Table 1.

TABLE 2

| Part of speech for left hand meaning representation | Link category | Requirement | Example |
|---|---|---|---|
| Aux Have | Complement | Perfect form of verb | have barked |
| Aux Be | Complement | Progressive form of verb | is barking |
| Noun | Has Subject | Finite form of verb | dog barker |
| Noun | Has Object | Passive form of verb | dog walked by a man |

Links Prevented

Only one link is resisted to avoid both Has Subject and Has Object links being formed for example for the phrase dog walked by a man. The correct link for the noun "dog" and the verb "walked" in this case is Has Object not Has Subject.

The verb can only have a noun as a subject if the verb is not a passive. In the example "dog walked by a man" the "dog" is the object not the subject.

Illegal Links

This is used to prevent certain links being formed when a word already has some links. For example between two consecutive nouns the link Is NomNom is made e.g. "dog basket" and thus the word "dog" has an Is NomNom link. When the word "is brown" are input to form the phrase "dog basket is brown" the subject of the verb "is" is basket and not "dog". Therefore the link from the verb "is" to the noun "dog" is prevented because "dog" already has an Is NomNom link. Table 3 below gives the rules to prevent illegal links.

TABLE 3

| Links prevented from being made to word | Link already made to word |
|---|---|
| Is NomNom | Has Specifier |
| | Is Subject |
| | Has Subject |
| | Is Object |
| | Is Object |
| | Is PObject |
| | Is PSubject |
| | Is Goal |
| | Is LeftConj |
| | Has LeftConj |
| | Relhead |
| Is Subject | Is NomNom |
| | Is Object |
| | Is Goal |
| Is Object | Is NomNom |
| | Has NomNom |
| | Is Subject |
| | Is Goal |
| | Relhead |
| Is PObject | Is Goal |
| Is Goal | Is NomNom |
| | Is Subject |
| | Is Object |
| | Relhead |
| Is PSubject | Is Subject |
| Has Subject | Is Complement |
| Has PObject | Relhead |
| any link | Is NomNom |

Links Needed

This type of constraint requires that in order for a link to be made to a word a link must already be present. The only constraint implemented is that if a right conjunction link is to be made to a noun a left conjunction link must already be present.

Link Blocks

In this type of constrain if the current word has a link of a particular type then it cannot have a link of another particular type back to any earlier word. For example in the phrase "give a dog a bone" the word "bone" is prevented from forming a NomNom link to "dog" because of the intermediate specifier "a". Table 4 below gives the rules to block Links.

TABLE 4

| Current Link for word | Prevented Link |
|---|---|
| Has Specifier | Has NomNom |
| Is Object | Has NomNom |
| Is Goal | Has NomNom |
| Has Modifier | Has NomNom |
| Has Relative | Has Subject |
| Is RightConj | Has NomNom |

Links Pruned

This type of constraint restricts or prunes the possibility of links back before a category of word. There are two such constraints.
(1) When the current word is a verb do not look back (i.e. to the left hand side of the verb) for any determiners to link to.
(2) When the current word is an Aux Have, Aux Be, or Aux Model do not look back for any nouns.

These constraints thus effect the links which are made using the possible links of Table 1.

Table 1 indicates the meaning data which is output from the parser taking into consideration the constraints. Although the link direction is indicated by Has or Is, and in general the links labelled Is are left to right links and the links labelled Has are right to left links, it has been found that in order to avoid errors, modifications to the link directions are required in accordance with the rules given in Table 5 below.

TABLE 5

| Part of speech of meaning representation on left | Link | Part of speech of meaning representation on right | Direction | Example |
|---|---|---|---|---|
| any | Has PSubject | any | → | dog → with a bone |
| any | Has RelHead | any | → | man → that walks |
| Complementiser | any | any | → | that → barked |
| RelPronoun | any | any | → | which → walked |
| To | any | any | → | copier to → print |
| Noun man | Has Object | Verb | → | dog → walked by |
| any documents | Has Subject | Gerund | → | copier → making |
| any | Has only | any | ← | fishing ← permits |
| any | any | any | → | killed → dog |

Using the relationships of Table 1 after application of the constraints, each the rules given in Table 5 are tried in turn until one matches. In this way, the first seven rules given in Table 5 represent the exceptions for which modifications of the link directions given from the parser is required.

The process of FIG. 11 then proceeds to step S3 wherein the lexical meaning representations for the input data and the reference data are aligned. This process comprises determining which lexical meaning representations in the input data and the reference data are equivalent in meaning. The alignment process takes place by comparing each lexical meaning representation of the input meaning data with each lexical meaning representation of the reference data to thereby register links therebetween if equivalence is found whereby a table identifying the positions of the matched or aligned lexical meaning representations is formed and stored.

In order to determine what lexical meaning representations are alignable (or equivalent) a set of rules for alignment can be implemented. In the present embodiment the following categories or types of lexical meaning representations are alignable:

nominal
verbal
noun
adverb
adjective
verb
passive
progressive
perfect
gerund.

The following categories or types of lexical meaning representations are not alignable:

determiner
preposition
intensifier
pronoun
relative pronoun
possessive pronoun
particle
auxiliary
complementiser
to
copular
negation
conjunction
subjunction
punctuation.

Further, since in this embodiment the matching of the input data and the reference data is determined by determining an accumulated score, the score given for lexical meaning representations which are of the same category is 1.0 whilst a score given for the equivalence of lexical meaning representations of alignable categories is 0.3 except for the alignment of an adjective and a gerund, a noun and an adjective, and a noun and a gerund which are each given a score of 1.0.

In addition to determining alignment by the parts of speech of the lexical meaning representations, an equivalence between lexical meaning representations can be given based on synonyms e.g. animal and beast, thesaurus relations e.g. rose and flower, and hierarchical relationships (hyponyms etc) e.g. copy and representation or document, and copier and office machine. Also, although the lexical meaning representations may take inflectional and derivational morphology into account, if the lexical meaning representations are highly specific and do not take these into account, the alignment of the lexical meaning representations can take morphological variations into account instead in order to ensure alignment of such lexical meaning representations. The equivalence between the lexical meaning representations using such equivalence relationships can be given as a score of between 0 and 1.0.

Each lexical meaning representation represents a set of words. Each word can be assigned a score which is dependent upon its frequency of occurrence in the natural language. Thus the words which occur rarely can be assigned a high score which can thus be used to increase the score of a match between the input data and the reference data if the word is identified to be present in both the input data and the reference data.

Another factor which can be taken into account during alignment is a meaning hierarchy and scores can be ascribed to equivalences between the specific words represented by the lexical meaning representations. Below are given two examples of such a meaning hierarchy.

Example 1

| "car" similar to "automobile" | degree 1.0 |
| "car" similar to "lorry" | degree 0.8 |
| "car" similar to "vehicle" | degree 0.6 |
| "car" similar to "bicycle" | degree 0.3 (via vehicle) |
| "car" similar to "train" | degree 0.1 (via vehicle) |

Example 2

| "copier" similar to "duplicator" | degree 0.9 |
| "copier" similar to "photocopier" | degree 0.9 |
| "copier" similar to "office machine" | degree 0.7 |

The result of the alignment process is a table indicating the locations of all alignable lexical meaning representations and scores for the alignment.

Figure 12:
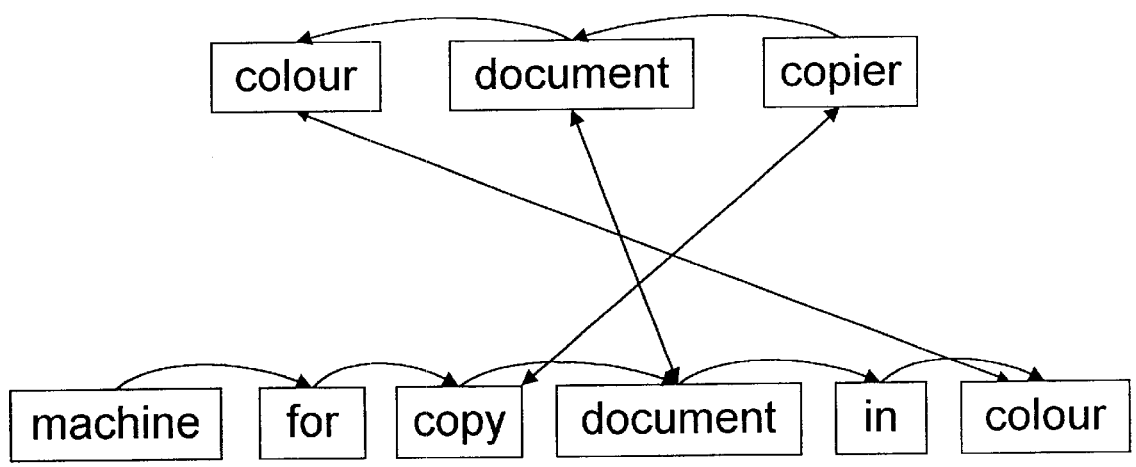
FIG. 12 is a diagram illustrating the alignment step of the method of FIG. 11.

FIG. 12 illustrates diagrammatically the alignment of the lexical meaning representations for the input phrase "colour document copier" with the stored phrase "machine for copying documents in colour". As can be seen in FIG. 12 the lexical meaning representations "colour" and "document" align exactly with the lexical meaning representations in the input and reference data and the input meaning representation "copier" aligns with the reference lexical meaning representation "copy" by a derivational morphological equivalence relationship.

In FIG. 12 the alignment of the lexical meaning representations is indicated by the bidirectional arrows whilst the links between the lexical meaning representations are given by the unidirectional arrows.

The process of FIG. 11 then proceeds to step S4 wherein a head lexical meaning representation is selected in the input data and an equivalent lexical meaning representation is identified in the reference data using the alignment data. The identification of the head lexical meaning representation in the input data requires the identification of a lexical meaning representation which does not modify any other lexical meaning representation. This can be achieved by forming a table of link data. For example for the input data illustrated in the top part of FIG. 12 the positions 1, 2 and 3 can be assigned respectively to the words colour document copier and Table 6 given below will be formed.

TABLE 6

| Modified Meaning Representation Position | Modifying Meaning Representation Position | Link |
| --- | --- | --- |
| 3 | 2 | Label 1 |
| 2 | 1 | Label 2 |

The head lexical meaning representation can be identified by identifying the head lexical meaning representation as being at the position which appears in the left hand column but not in the right hand column of Table 3 i.e. position 3 which corresponds to the lexical meaning representation "copier". Having identified that the head lexical meaning representation of the input data is "copier" as can be seen in FIG. 12 this can be aligned with the lexical meaning representation "copy" in the reference data using the alignment data. Since the alignment data may indicate many different alignments between the lexical meaning representation of the input data and the lexical meaning representations of the reference data, each will be tried in the matching process described hereinafter.

Figure 13A:
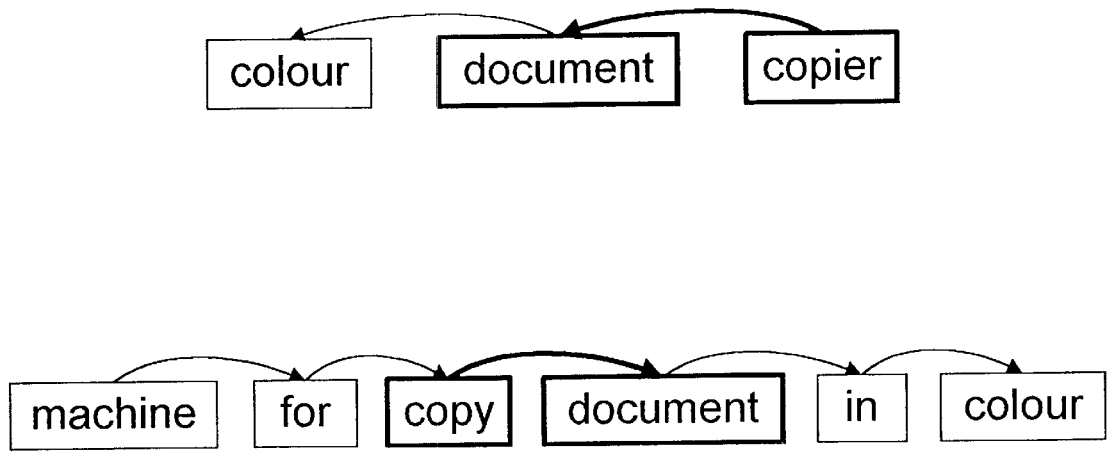
FIGS. 13a and 13b illustrate the recursive matching process.

The process of FIG. 11 then proceeds to step S5 wherein an aligned lexical meaning representation which is linked to the head lexical meaning representation in the input data is identified from the link data of the meaning data output from the parser, and any equivalent lexical meaning representation in the reference data is identified using the alignment data. This process is illustrated in FIG. 13a. As can be seen in FIG. 13a the head lexical meaning representation "copier" in the input data is aligned with the lexical meaning representation "copy" in the reference data and the linked lexical meaning representation "document" is identified in the input data using the link data output from the parser. An equivalent lexical meaning representation "document" is then identified in the reference data.

In the process of FIG. 11 the process then proceeds to step S6 wherein the linked pairs of lexical meaning representations are compared for equivalence. The comparison of equivalence is carried out on the basis of a set of relationships which defines the equivalence of the paths. The equivalence relationships used in this embodiment are given in Table 7 below.

TABLE 7

| Input Data Path | Reference Data Path | Score | Example |
| --- | --- | --- | --- |
| Any link to Noun | Any links to To-Verb | 1.0 | copy: machine to copy |
| Any link to Noun | Any links to Preposition-Gerund | 1.0 | copier: machine which copies |
| Noun Many Nouns | Noun | 0.5 | document copier: document |
| Has NomNom link | Has subject link | 0.3 | colour copier: machine that colours (N)/copies (V) |
| Head-Noun | Head-Gerund | 1.0 | copier: document produced by a copier |
| Head-Noun | Head not a Noun any links to Noun | 0.3 | copier: document produced by a copier |
| Has NomNom link | ConjN, any links | 0.0 | document copier: copier and document collator |

In Table 7 the equivalence of paths is given a score. The term "any links" means that any number of links can be matched unconditionally i.e. multiple links can match a single link thereby skipping over intermediate meaning representations. The term "Head" indicates that the lexical meaning representation is the head lexical meaning representation.

Using the relationships of Table 7 it can thus be determined in step S7 whether the paths match i.e. the score for the match. If the score is greater than a threshold e.g. greater than zero, in the flow diagram of FIG. 11 the process proceeds from step S7 to step S8 wherein the linked lexical meaning representation is nominally made the head. In step S9 the score is accumulated and this entails in accumulating the score for the path together with the score for the aligned lexical meaning representations and any other scores such as scores for aligning specific words. The process then returns to step S5 to recursively proceed along the chain linked pairs of lexical meaning representations in order to identify aligned pairs of lexical meaning representations and to compare paths in order to accumulate a score.

Figure 13B:
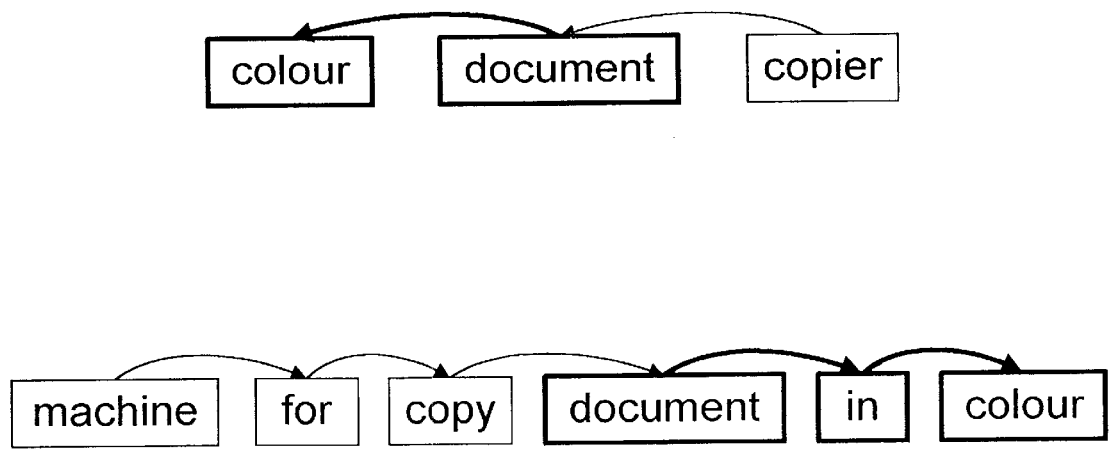

FIG. 13b illustrates steps S5 and S6 on the second loop wherein the lexical meaning representation "document" is made nominally the head and the linked lexical meaning representation "colour" is identified in the input data. It is determined from the alignment data that this links with the lexical meaning representation "colour" in the reference data. In the comparison step S6 the path for "colour document" is then compared with the path for "document in colour". As can be seen, the path between the lexical meaning representations "document" and "colour" in the reference data is not a direct path i.e. multiple links are present. The matching process may take into consideration the difference in number of links present and assign a score dependent upon the number of links i.e. the score is decreased for a larger number of links.

If in the process of FIG. 11 no match is found or the score for the match is below a threshold e.g. zero, the process proceeds to step S10 whereupon it is determined that if there are any branches in the linked lexical meaning representation structure the process proceeds to step S11 wherein the lexical meaning representation at which branching occurred is made nominally the head and in step S12 the score is accumulated for the matching. The process then returns to step S5 to determine an accumulated score for the branch.

Figure 16:
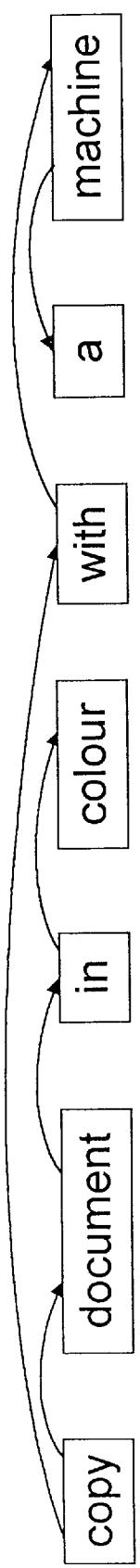
FIG. 16 illustrates a branched dependency grammar structure.

FIG. 16 illustrates a linked lexical meaning representation structure which has a branch at the head lexical meaning representation "copy". If the phrase of FIG. 16 was either the input data or the reference data each of the branches would be matched to the input data or reference data to accumulate a score for each branch and total score for the matching of the phrase would be the product of the accumulated scores for the branches.

If all of the branches have been matched in step S10 the process proceeds in step S13 in FIG. 11 wherein the result of the accumulation of matches is output as a score. This can then be compared with a predetermined set of parameters in step S14 e.g. a threshold and the match result is output in step S15.

Steps S1 to S13 can be implemented for a number of sets of reference data in order to provide a number of accumulated scores. The reference data having the highest accumulated score can then be selected as the reference data to which the input data matches. A restriction could be placed on this matching in that this match is only indicated if a threshold accumulated score is achieved i.e. the quality of match is good enough.

Matching of the paths of the linked pairs of lexical meaning representations can be dependent upon many different matching rules such as the types and number of links and the types of lexical meaning representations comprising the linked pair.

More generally matching can occur by matching all identified linked pairs irrespective of the types and number of links. The matching could be limited to direct links or the matching could be limited to only matching links of identical type.

The preferred embodiment uses a set of rules which define a set of rules which take into account indirect links and link types.

In the path matching process in step S5 only meaning representations which have significance are identified. Thus meaning representations which are not important e.g. determiners, intensifiers, prepositions and pronouns are not used in the matching process.

In order to take into consideration negation, at the end of a match i.e. when no further matches are found in step S7 of FIG. 11, the reference meaning data can be further studied to identify negation. For example, if the input data is "colour document copier" and the reference data is "not a colour document copier" the process will find a match for "colour document copier" and the further linked lexical meaning representations can be identified and compared with known negation lexical meaning representations to reduce the accumulated score or to indicate that there is no match.

Figure 14:
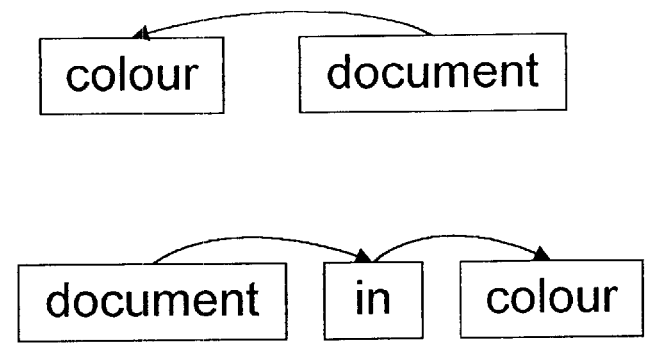
FIG. 14 illustrates matching links with multiple links.

Using the set of relationships which define the equivalence between linked pairs of lexical meaning representations allows for an accurate match of the meaning of input data and reference data. For example, FIG. 14 illustrates the input data comprising "colour document" which is to be matched with the reference data "document in colour". By equating the single link between "document in colour" with the multiple link with the intermediate lexical meaning representation "in" the input data will be matched to the reference data.

Figure 15A:
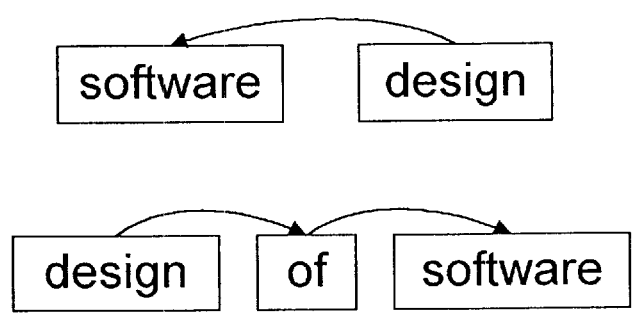
FIGS. 15a and 15b illustrate the sensitivity of the matching process.
Figure 15B:
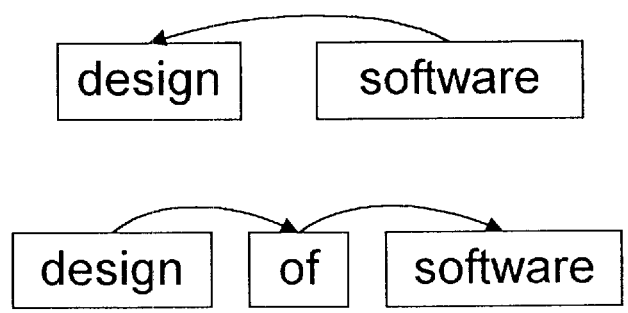

FIGS. 15a and 15b illustrate the sensitivity of this form of meaning matching. If the input data is "software design" to be matched to the reference data "design of software", a match can be found because of the equivalence of the multiple link with the intermediate lexical meaning representation "of". In 15b however with the input data "design software" and the reference data "design of software" a match will not be found since the modification direction is different.

As described hereinabove with reference to the embodiments illustrated in FIGS. 2 to 10 once the matching operation has been carried out, the result of the match can be used for many different applications. The simplest result is the cause of an action e.g. the generation of a computer instruction. However, where accumulated scores are used to determine the match between the input data and the reference data, it is not always desirable for the result of the match simply to be an identification of the best match for a matching of the input data with multiple sets of reference data or an indication of whether there is a match where there is only one set of reference data. The result of the matching process may be the identification of a number of sets of reference data to which matching has been found to a certain degree together with an indication of that degree i.e. the accumulated score. Where only one set of reference data is present, the result can simply be the accumulated score giving an indication of the likelihood of the match being a good match.

It will be apparent from the description of the embodiments given hereinabove that the present invention provides a far more simple user interface allowing a user to enter data representing a phrase, sentence, or passage of a natural language in order to cause a machine to operate in a particular fashion. Such a technique is particularly applicable to the retrieval of information from a database wherein the searching can take place either on the information to be retrieved itself or on indexing data. The present invention is also applicable to any apparatus wherein a command is to be entered in order to control the operation of apparatus. In such apparatus sets of reference data which represent command phrases in a natural language can be stored so that when command phrases in the natural language are entered by a user these can be matched using the matching process of the present invention in order that the corresponding instruction can be carried out.

Although the present invention has been described hereinabove with reference to specific embodiments, the present invention is not limited to these specific embodiments and it will be apparent to a skilled person in the art that modifications are possible within the spirit and scope of the present invention. For example, although in the embodiments the lexical meaning representations are stated as representing a set of words i.e. defining a general meaning, the lexical meaning representations can comprise the words themselves. Also, although in the embodiments the method of alignment i.e. finding equivalence between lexical meaning representations is described as a process separate to and preceding the matching of the paths, this process can be carried out in combination. Further, the present invention is applicable to data which can be represented as any natural language which can be parsed to provide meaning representations and modification relationships therebetween. Still further, the generation of the meaning data in the present invention can be carried out by any known parser which enables meaning representations and modification relationships to be determined therefrom. Many such parsers are well known in the prior art, one such being the dependency parser which directly generates meaning representations and modification relationships. The present invention is not however limited to the use of such a parser to form the meaning data.

What is claimed is:

1. A method of generating a machine executable instruction, the method comprising the steps of:
   inputting data representing a phrase, sentence, or passage of a natural language;
   analysing said input data to generate meaning data structured in computer usable form as lexical meaning representations and links therebetween having regard to the grammar of the natural language, said links indicating which of said lexical meaning representations modify others of said lexical meaning representations;
   comparing the meaning data for the input data with meaning data for reference data by determining equivalent lexical meaning representations in said meaning data for the input data and the reference data linked by equivalent links starting from a head lexical meaning representation which does not modify any others of said lexical meaning representations in said meaning data for the input data in accordance with a set of relationships defining equivalence between at least one of lexical meaning representations, linked lexical meaning representations, and links; and
   generating a machine executable instruction in dependence upon the result of the comparing step.

2. A method according to claim 1 wherein the comparing step comprises:
   a) identifying a first lexical meaning representation in said meaning data for the input data,
   b) identifying any corresponding first lexical meaning representation in the meaning data for the reference data,
   c) identifying a second lexical meaning representation which modifies the first lexical meaning representation,
   d) identifying any corresponding second lexical meaning representation linked to the identified corresponding first lexical meaning representation in the meaning data for the reference data,
   e) determining the equivalence of any linked first and second lexical meaning representations in the meaning data for the input data and the reference data according to the set of relationships, and
   f) if an equivalence is found in step (e), repeating steps (c) to (e) for each $(n+1)^{th}$ lexical meaning representation which modifies each $n^{th}$ lexical meaning representation until no equivalence is found in step (e), where n is an integer of 2 or more.

3. A method according to claim 1 wherein the machine executable instruction is generated in dependence upon the number of determined equivalent linked lexical meaning representations.

4. A method according to claim 1 wherein said set of relationships give a score for the equivalence, the equivalence of linked lexical meaning representations is determined as an accumulated score, and the machine executable instruction is generated in dependence upon the accumulated score.

5. A method according to claim 4 wherein said set of relationships include a score for the occurrence of a lexical meaning representation, less commonly occurring lexical meaning representations having a higher score than more commonly occurring lexical meaning representations.

6. A method according to claim 4 wherein said set of relationships gives a score for the equivalence of types of each lexical meaning representation.

7. A method according to claim 4 wherein said set of relationships gives a score for the equivalence of types of links between lexical meaning representations.

8. A method according to claim 4 including the step of detecting negation in lexical meaning representations linked to the determined equivalent linked lexical meaning representations in the meaning data for the reference data, and reducing the accumulated score if negation is detected.

9. A method according to claim 1 wherein any meaning data for the input data which has not been determined to be equivalent to the meaning data for the reference data is output.

10. A method according to claim 1 wherein any meaning data for the reference data which has not been determined to be equivalent to the meaning data for the input data is output.

11. A method according to claim 1 wherein the meaning data for the input data and reference data which is determined to be equivalent is output.

12. A method according to claim 1 wherein said set of relationships define some links as being equivalent to multiple links skipping over one or more intermediate lexical meaning representations.

13. A method according to claim 12 wherein said set of relationships give a score for the equivalence including a score for the equivalence of links dependent upon the number of multiple links skipped over between equivalent lexical meaning representations in the meaning data for the reference data, the equivalence of linked lexical meaning representations is determined as an accumulated score and the machine executable instruction is generated in dependence upon the accumulated score.

14. A method according to claim 1 wherein lexical meaning representations in the meaning data for the input data and the reference data which have no significant content are not used for the determination of equivalence.

15. A method according to claim 1 wherein if the meaning data branches and a lexical meaning representation in said meaning data for the input data and/or the reference data is modified by more than one other lexical meaning representation the step of determining equivalence determines the equivalence of each branch in turn.

16. A method according to claim 1 including the step of receiving said reference data and analysing said reference data to generate said meaning data for said reference data.

17. A method according to claim 1 wherein said machine executable instruction causes one of the identification of the reference data for which equivalent meaning data is determined, the retrieval of the reference data for which equivalent meaning data is determined, the routing of the input data in accordance with the reference data for which equivalent meaning data is determined, the retrieval of data related to the reference data for which equivalent meaning data is determined, the implementation of an action described in the input data and defined in the reference data for which equivalent meaning data is determined.

18. A method according to claim 1 wherein said inputting step comprises inputting one of speech recognition data, optical character recognition data, typed text, and data transferred from a remote machine.

19. A method of recognising data in computer usable form, the method comprising the steps of:
   inputting data representing a phrase, sentence or passage of a natural language;
   analysing said input data to generate meaning data structured in computer usable form as lexical meaning representations and links therebetween having regard to the grammar of the natural language, said links indicating which of said lexical meaning representation modify others of said lexical meaning representations;
   comparing the meaning data for the input data with meaning data for reference data by repeatedly determining equivalent chain linked pairs of lexical meaning representations in said meaning data for the input data and the reference data starting at a head lexical meaning representation in the meaning data for the input data and in accordance with a set of relationships defining equivalence between at least one of lexical meaning representations, linked lexical meaning representations, and links; and
   recognising the meaning data for the input data in accordance with the result of the comparison.

20. A method according to claim 19 wherein said comparing step comprises comparing said meaning data for the input data with a plurality of sets of reference data, and the recognising step comprises identifying the set of reference data the meaning data for which best matches the meaning data for the input data.

21. A method according to claim 19 wherein the meaning data for the input data is recognised in dependence upon the number of determined equivalent linked pairs of lexical meaning representations.

22. A method according to claim 19 wherein said set of relationships give a score for the equivalence, the equivalence of linked lexical meaning representations is determined as an accumulated score, and the machine executable instruction is generated in dependence upon the accumulated score.

23. A method according to claim 22 wherein said set of relationships include a score for the occurrence of a lexical meaning representation, less commonly occurring lexical meaning representations having a higher score than more commonly occurring lexical meaning representations.

24. A method according to claim 22 wherein said set of relationships gives a score for the equivalence of types of each lexical meaning representation.

25. A method according to claim 22 wherein said set of relationships gives a score for the equivalence of types of links between lexical meaning representations.

26. A method according to claim 22 including the step of detecting negation in lexical meaning representations linked to the determined equivalent linked lexical meaning representations in the meaning data for the reference data, and reducing the accumulated score if negation is detected.

27. A method according to claim 19 wherein the input data corresponding to any part of the meaning data therefor which has not been determined to be equivalent to the meaning data for the reference data is output.

28. A method according to claim 19 wherein the reference data corresponding to any part of the meaning data therefor which has not been determined to be equivalent to the meaning data for the input data is output.

29. A method according to claim 19 wherein the input data corresponding to any part of the meaning data therefor which has been determined to be equivalent to the meaning data for the reference data is output.

30. A method according to claim 19 wherein said set of relationships define some links as being equivalent to multiple links skipping over one or more intermediate lexical meaning representations.

31. A method according to claim 30 wherein said set of relationships give a score for the equivalence including a score for the equivalence of links dependent upon the number of multiple links skipped over between equivalent lexical meaning representations in the meaning data for the reference data, the equivalence of linked lexical meaning representations is determined as an accumulated score and the meaning data is recognised in dependence upon the accumulated score.

32. A method according to claim 19 wherein lexical meaning representations in the meaning data for the input data and the reference data which have no significant content are not used for the determination of equivalence.

33. A method according to claim 19 wherein if the meaning data branches and a lexical meaning representation in said meaning data for the input data and/or the reference data is modified by more than one other lexical meaning representation the step of determining equivalence determines the equivalence of each branch in turn.

34. A method according to claim 19 including the step of receiving said reference data and analysing said reference data to generate said meaning data for said reference data.

35. A method according to claim 19 wherein said step of determining equivalent chain linked pairs of lexical meaning representations includes an initial step of identifying equivalent lexical meaning representations in the meaning data for the input data and the reference data, and registering an equivalence between identified equivalent lexical meaning representations; wherein the equivalent chain linked pairs of lexical meaning representations are determined using said registered equivalences, said links, and said set of relationships.

36. Apparatus for generating a machine executable instruction, the apparatus comprising:
   input means for inputting data representing a phrase, sentence or passage of a natural language.
   analysing means for analysing said input data to generate meaning data structured in computer usable form as lexical meaning representations and links therebetween having regard to the grammar of the natural language, said links indicating which of said lexical meaning representations modify others of said lexical meaning representations;
   comparing means for comparing the meaning data for the input data with meaning data for reference data by determining equivalent lexical meaning representations in said meaning data for the input data and the reference data linked by equivalent links starting from a head lexical meaning representation which does not modify any others of said lexical meaning representations in said meaning data for the input data in accordance with a set of relationships defining equivalence between at least one of lexical meaning representations, linked lexical meaning representations, and links; and generating means for generating a machine executable instruction in dependence upon the result of the comparing step.

37. Apparatus according to claim 36 wherein said comparing means includes
a) means for identifying a first lexical meaning representation in said meaning data for the input data,
b) means for identifying any corresponding first lexical meaning representation in the meaning data for the reference data,
c) means for identifying a second lexical meaning representation which modifies the first lexical meaning representation,
d) means for identifying any corresponding second lexical meaning representation linked to the identified corresponding first lexical meaning representation in the meaning data for the reference data, and
e) means for determining the equivalence of any linked first and second lexical meaning representations in the meaning data for the input data and the reference data according to the set of relationships;
wherein if an equivalence is found by said determining means each of said identifying means and said determining means are adapted to repeatedly operate for each $(n+1)^{th}$ lexical meaning representation which modifies each $n^{th}$ lexical meaning representation until no equivalence is found by said determining means, where n is an integer of 2 or more.

38. Apparatus according to claim 36 wherein said generating means is adapted to generate the machine executable instruction in dependence upon the number of determined equivalent linked lexical meaning representations.

39. Apparatus according to claim 36 wherein said set of relationships give a score for the equivalence, said comparing means is adapted to determine the equivalence of linked lexical meaning representations as an accumulated score, and said generating means is operable in dependence upon said accumulated score.

40. Apparatus according to claim 39 wherein said determining means is adapted to determine equivalence in accordance with said set of relationships which include a score for the occurrence of a lexical meaning representation, less commonly occurring lexical meaning representations having a higher score than more commonly occurring lexical meaning representations.

41. Apparatus according to claim 39 wherein said determining means is adapted to determine equivalence in accordance with said set of relationships which give a score for the equivalence of types of meaning representations.

42. Apparatus according to claim 39 wherein said determining means is adapted to determine equivalence in accordance with said set of relationships which give a score for the equivalence of types of links between lexical meaning representations.

43. Apparatus according to claim 39 including means for detecting negation in lexical meaning representations linked to the determined equivalent linked lexical meaning representations in the meaning data for the reference data, and for reducing the accumulated score if negation is detected.

44. Apparatus according to claim 36 including means for outputting any meaning data for the input data which has not been determined to be equivalent to the meaning data for the reference data.

45. Apparatus according to claim 36 including means for outputting any meaning data for the reference data which has not been determined to be equivalent to the meaning data for the input data.

46. Apparatus according to claim 36 including means for outputting the meaning data for the input data and the reference data which is determined to be equivalent.

47. Apparatus according to claim 36 wherein said comparing means is adapted to determine equivalence in accordance with said set of relationships which define some links as being equivalent to multiple links over several intermediate lexical meaning representations.

48. Apparatus according to claim 47 wherein said set of relationships give a score for the equivalence including a score for the equivalence of links dependent upon the number of multiple links skipped over between equivalent lexical meaning representations in the meaning data for the reference data, said comparing means is adapted to determine the equivalence of linked lexical meaning representations as an accumulated score, and said generating means is adapted to generate the machine executable instruction in dependence upon the accumulated score.

49. Apparatus according to claim 36 wherein said comparing means is adapted not to use lexical meaning representations in the meaning data for the input data and the reference data which have no significant content for the determination of equivalence.

50. Apparatus according to claim 36 if the meaning data branches and a lexical meaning representation in said meaning data for the input data and/or the reference data is modified by more than one other lexical meaning representation, said comparing means is adapted to determine the equivalence of each branch in turn.

51. Apparatus according to claim 36 including means for receiving said reference data, and wherein said analysing means is adapted to generate said meaning data for said reference data by analysis of said reference data.

52. Apparatus according to claim 36 wherein said input means is adapted to input one of speech recognition data, optical character recognition data, typed text data, and data transferred from a remote machine.

53. Recognition apparatus comprising
input means for inputting data representing a phrase, sentence, or passage of a natural language;
analysing means for analysing said input data to generate meaning data structured in computer usable form as lexical meaning representations and links therebetween having regard to the grammar of the natural language, said links indicating which of said lexical meaning representations modify others of said lexical meaning representations;
comparing means for comparing the meaning data for the input data with meaning data for reference data by repeatedly determining equivalent chain linked pairs of lexical meaning representations in said meaning data for the input data and the reference data starting at a head lexical meaning representation in the meaning data for the input data and in accordance with a set of relationships defining equivalence between at least one of lexical meaning representations, linked lexical meaning representations, and links; and
recognition means for recognising the meaning data for the input data in accordance with the result of the comparison.

54. Recognition apparatus according to claim 53 wherein said comparing means is adapted to compare said meaning data for the input data with a plurality of sets of reference data, and said recognition means is adapted to identify the set of reference data the meaning data for which best matches the meaning data for the input data.

55. Recognition apparatus according to claim 53 wherein said recognition means is adapted to recognise the meaning data for the input data in dependence upon the number of determined equivalent linked pairs of lexical meaning representations.

56. Recognition apparatus according to claim 53 wherein said set of relationships give a score for the equivalence, said comparing means is adapted to determine the equivalence of linked lexical meaning representations as an accumulated score, and said generating means is operable in dependence upon said accumulated score.

57. Recognition apparatus according to claim 56 wherein said determining means is adapted to determine equivalence in accordance with said set of relationships which include a score for the occurrence of a lexical meaning representation, less commonly occurring lexical meaning representations having a higher score than more commonly occurring lexical meaning representations.

58. Recognition apparatus according to claim 56 wherein said determining means is adapted to determine equivalence in accordance with said set of relationships which give a score for the equivalence of types of lexical meaning representations.

59. Recognition apparatus according to claim 56 wherein said determining means is adapted to determine equivalence in accordance with said set of relationships which give a score for the equivalence of types of links between lexical meaning representations.

60. Recognition apparatus according to claim 56 including means for detecting negation in lexical meaning representations linked to the determined equivalent linked lexical meaning representations in the meaning data for the reference data, and for reducing the accumulated score if negation is detected.

61. Recognition apparatus according to claim 53 including means for outputting any meaning data for the input data which has not been determined to be equivalent to the meaning data for the reference data.

62. Recognition apparatus according to claim 53 including means for outputting any meaning data for the reference data which has not been determined to be equivalent to the meaning data for the input data.

63. Recognition apparatus according to claim 53 including means for outputting the meaning data for the input data and the reference data which is determined to be equivalent.

64. Recognition apparatus according to claim 53 wherein said comparing means is adapted to determine equivalence in accordance with said set of relationships which define some links as being equivalent to multiple links over several intermediate lexical meaning representations.

65. Recognition apparatus according to claim 64 wherein said set of relationships give a score for the equivalence including a score for the equivalence of links dependent upon the number of multiple links skipped over between equivalent lexical meaning representations in the meaning data for the reference data, said comparing means is adapted to determine the equivalence of linked lexical meaning representations as an accumulated score, and said recognition means is adapted to recognise the meaning data in dependence upon the accumulated score.

66. Recognition apparatus according to claim 53 wherein said comparing means is adapted not to use lexical meaning representations in the meaning data for the input data and the reference data which have no significant content for the determination of equivalence.

67. Recognition apparatus according to claim 53 if the meaning data branches and a lexical meaning representation in said meaning data for the input data and/or the reference data is modified by more than one other lexical meaning representation, said comparing means is adapted to determine the equivalence of each branch in turn.

68. Recognition apparatus according to claim 53 wherein including means for receiving said reference data, and wherein said analysing means is adapted to generate said meaning data for said reference data by analysis of said reference data.

69. Recognition apparatus according to claim 53 wherein said determining means includes means for initially identifying equivalent lexical meaning representations in the meaning data for the input data and the reference data, and registering an equivalence between identified equivalent lexical meaning representations, and means for determining the equivalent chain linked pairs of lexical meaning representations using said registered equivalences, said links, and said set of relationships.

70. Apparatus for matching input data representing a phrase, sentence or passage of a natural language with one or more sets of reference data representing a phrase sentence or passage of the natural language, the apparatus comprising input means for inputting the input data and the reference data;

analysing means for analysing the input data and the reference data to generate input meaning data and reference meaning data respectively structured as lexical meaning representations and links therebetween having regard to the grammar of the natural language, said links indicating which of said lexical meaning representations modify others of said lexical meaning representations;

comparing means for comparing the input meaning data and the reference meaning data by identifying a head lexical meaning representation in the input meaning data which does not modify any other lexical meaning representations and an equivalent lexical meaning representation in the reference meaning data and determining equivalent lexical meaning representations in the input meaning data and the reference meaning data chain linked to the head lexical meaning representation or its equivalent respectively, the equivalence being determined using a set of relationships defining equivalence between at least one of lexical meaning representations, linked pairs of lexical meaning representations, and links; and matching means for determining the match between the input data and the or each set of reference data based on the output of the comparing means.

71. Apparatus according to claim 70 wherein the matching means is adapted to determine a match based on the number of equivalent linked pairs of lexical meaning representations determined.

72. Apparatus according to claim 70 wherein said set of relationships give a score for the equivalence, said comparing means is adapted to determine the equivalence of linked pairs of lexical meaning representations by accumulating the score, and said matching means is adapted to determine the match based on the accumulated score.

73. Apparatus according to claim 70 including output means for outputting an indication of the match.

74. Apparatus according to claim 73 wherein said output means is adapted to output at least one of parts of the input data and the reference data which are determined to match, any part of the input data which is determined not to match the reference data, and any part of the reference data which is determined not to match the input data.

75. Apparatus according to claim 70 wherein said comparing means is adapted to determine equivalence using said set of relationships which define at least one link as being equivalent to multiple links which skip over one or more intermediate lexical meaning representations.

76. Apparatus according to claim 75 wherein said set of relationships give a score for the equivalence including a score for the equivalence of links dependent upon the number of links in an equivalent multiple link, said comparing means is adapted to determine the equivalence of the chain linked pairs of lexical meaning representations as an accumulated score, and said matching means is adapted to determine the match based on the accumulated score.

77. Apparatus according to claim 70 wherein said comparing means is adapted not to use lexical meaning representations in the meaning data for the input data and the reference data which have no significant content for the determination of equivalence.

78. Apparatus according to claim 70 if the meaning data branches and a lexical meaning representation in said meaning data for the input data and/or the reference data is modified by more than one other meaning representation, said comparing means is adapted to determine the equivalence of each branch in turn.

79. A method of matching input data representing a phrase, sentence, or passage of a natural language with one or more sets of reference data representing a phrase, sentence, or passage of the natural language, the method comprising the steps of:

analysing the input data and the reference data to generate input meaning data and reference meaning data respectively structured as lexical meaning representations and links therebetween having regard to the grammar of the natural language, said links indicating which of said lexical meaning representations modify others of said lexical meaning representations;

comparing the input meaning data with the reference meaning data by identifying a head lexical meaning representation in the input meaning data which does not modify any other lexical meaning representations identifying an equivalent lexical meaning representation in the reference meaning data, and determining equivalent lexical meaning representations in the input meaning data and the reference meaning data chain linked to the head lexical meaning representation or its equivalent respectively, the equivalence being determined using a set of relationships defining equivalence between at least one of lexical meaning representations, linked pairs of lexical meaning representations, and links; and determining the match between the input data and the or each set of reference data based on the result of the comparison step.

80. A method according to claim 79 wherein the match is determined based on the number of equivalent linked pairs of lexical meaning representations determined.

81. A method according to claim 79 wherein said set of relationships give a score for the equivalence, the equivalence of linked pairs of lexical meaning representations is determined as an accumulated score, and the matching is determined based on the accumulated score.

82. A method according to claim 79 including the step of outputting an indication of the match.

83. A method according to claim 82 wherein at least one of parts of the input data and the reference data which are determined to match, any part of the input data which is determined not to match the reference data, and any part of the reference data which is determined not to match the input data is output.

84. A method according to claim 79 wherein said set of relationships define at least one link as being equivalent to multiple links which skip over one or more intermediate lexical meaning representations.

85. A method according to claim 84 wherein said set of relationships give a score for the equivalence including a score for the equivalence of links dependent upon the number of links in an equivalent multiple link, the equivalence is determined as an accumulated score, and the match is determined based on the accumulated score.

86. A method according to claim 79 wherein lexical meaning representations in the meaning data for the input data and the reference data which have no significant content are not used for the determination of equivalence.

87. A method according to claim 79 wherein if the meaning data branches and a lexical meaning representation in said meaning data for the input data and/or the reference data is modified by more than one other lexical meaning representation the step of determining equivalence determines the equivalence of each branch in turn.

88. A data processing apparatus for processing data having the apparatus of claim 36 and including means responsive to said machine executable instruction.

89. Apparatus having a user interface comprising the apparatus of claim 36.

90. A computer usable medium having computer readable instructions stored therein for causing a processor to process input and reference data representing a phrase, sentence, or passage of a natural language to determine if there is a match in the meaning, the instructions comprising:

a) causing the processor to analyse the input and reference data to generate input meaning data and reference meaning data respectively comprising lexical meaning representations and links therebetween having regard to the grammar of the natural language, said links indicating which of said lexical meaning representations modify others of said lexical meaning representations;

b) causing the processor to compare the input meaning data with the reference meaning data by repeatedly determining equivalent chain linked pairs of lexical meaning representations in said input meaning data and said reference meaning data starting at a head lexical meaning representation in said input meaning data and in accordance with a set of relationships defining equivalence between at least one of the lexical meaning representations, linked lexical meaning representations, and links; and c) causing the processor to register a match between the input data and the reference data in dependence upon the result of the comparison.

91. A carrier medium carrying processor implementable instructions for controlling a processor to carry out the method of any one of claims 1 to 35 or 79 to 87.

92. An encoded signal carrying processor implementable instructions for controlling a processor to carry out the method of any one of claims 1 to 35 or 79 to 87.

* * * * *